United States Patent [19]

Hiscox et al.

[11] Patent Number: 5,495,374
[45] Date of Patent: Feb. 27, 1996

[54] AUTOMATIC LOADER MECHANISM FOR MAGNETIC TAPE CARTRIDGE WITH TENSION CONTROL

[75] Inventors: Steven G. Hiscox; Paul A. Merems; Kenneth R. Shelley, all of Tucson, Ariz.

[73] Assignee: International Business Machines Corporation, Armonk, N.Y.

[21] Appl. No.: 229,900

[22] Filed: Apr. 19, 1994

[51] Int. Cl.$^6$ .................................................. G11B 5/008
[52] U.S. Cl. .............................................. 360/93; 360/96.5
[58] Field of Search ....................................... 360/93, 96.5

[56] References Cited

U.S. PATENT DOCUMENTS

| | | | |
|---|---|---|---|
| Re. 33,224 | 5/1990 | Spiegelstein | 36/93 |
| 3,692,255 | 9/1972 | Von Behren | 242/343.2 |
| 3,932,891 | 1/1976 | Horvath | 360/93 |
| 3,962,727 | 6/1976 | Kamimura et al. | 360/85 |
| 4,130,848 | 12/1978 | Amano et al. | 360/132 |
| 4,156,260 | 5/1979 | Joshi | 360/96.1 |
| 4,181,823 | 1/1980 | DeLamoreaux | 360/137 X |
| 4,498,112 | 2/1985 | Georgeas et al. | 360/96.5 |
| 4,555,077 | 11/1985 | Platter et al. | 242/198 |
| 4,556,923 | 12/1985 | Olmsted | 360/93 |
| 4,573,091 | 2/1986 | Barton et al. | 360/93 |
| 4,586,095 | 4/1986 | Olmsted | 360/93 |
| 4,656,541 | 4/1987 | Rhyner et al. | 360/96.5 |
| 4,673,995 | 6/1987 | W. Spiegelstein | 360/93 |
| 4,677,508 | 6/1987 | Barton et al. | 360/96.5 |
| 4,785,363 | 11/1988 | Jacobs et al. | 360/93 |
| 4,807,067 | 2/1989 | Spiegelstein | 360/93 |
| 4,866,552 | 9/1989 | Nagase | 360/96.5 |
| 4,991,037 | 2/1991 | Shimizu et al. | 360/71 |
| 5,025,334 | 6/1991 | Perona et al. | 360/96.5 |
| 5,034,833 | 7/1991 | Marlowe | 360/96.5 |
| 5,059,772 | 10/1991 | Younglove | 360/92 X |
| 5,088,655 | 2/1992 | Nakanishi et al. | 242/198 |
| 5,089,920 | 2/1992 | Bryer et al. | 360/92 |
| 5,103,357 | 4/1992 | Nakamishi | 360/96.5 |
| 5,109,308 | 4/1992 | Kukreja et al. | 360/93 |
| 5,128,817 | 7/1992 | Herger et al. | 360/92 |
| 5,204,792 | 4/1993 | Bryer | 360/93 |
| 5,227,935 | 7/1993 | Gordon et al. | 360/95 |
| 5,236,258 | 8/1993 | Bunch | 360/92 X |
| 5,237,469 | 8/1993 | Kukreja et al. | 360/93 |
| 5,255,256 | 10/1993 | Engler et al. | 360/97.02 X |
| 5,289,324 | 2/1994 | Katoku et al. | 360/96.5 |
| 5,294,072 | 3/1994 | East et al. | 242/199 |

FOREIGN PATENT DOCUMENTS

| | | | |
|---|---|---|---|
| 238752 | 9/1987 | European Pat. Off. | |
| 0556441 | 8/1993 | European Pat. Off. | G11B 15/675 |
| 2154544 | 9/1985 | United Kingdom | |
| 2164782 | 3/1986 | United Kingdom | G11B 23/087 |

OTHER PUBLICATIONS

R. T. Larson, et al., "Mechanical Interlock Device", IBM Technical Disclosure Bulletin, vol. 5, No. 12, May 1963, pp. 1–2.

C. P. Barnard, et al., "Door Actuator for Tape Cartridge", IBM Technical Disclosure Bulletin, vol. 8, No. 1, Jun. 1965, pp. 162–163.

(List continued on next page.)

*Primary Examiner*—John H. Wolff
*Attorney, Agent, or Firm*—Baker, Maxham, Jester & Meador

[57] ABSTRACT

A carriage assembly slidingly receives a tape cartridge whose forward end tape access door is opened during insertion of the cartridge by a user or an automatic picker of a tape library system. A single motor driven cam automatically moves the mated carriage assembly and tape cartridge to engage a head with an exposed segment of magnetic tape. The cartridge stops and the carriage assembly continues to move slightly forward from the tape cartridge. This allows the same motor driven cam to automatically move a pair of clutch assemblies transverse to the cartridge insertion axis into engagement with a pair of reel hubs of the tape cartridge. The engagement of the clutch assemblies unlocks the reels inside the tape cartridge for rotation by a pair of reel motors. A rigid mount plate of the tape cartridge is automatically clamped against a plurality of datums.

31 Claims, 18 Drawing Sheets

OTHER PUBLICATIONS

L. R. Beach, "Tape Cartridge Opening and Tape Reel Clamping Mechanism", IBM Technical Disclosure Bulletin, vol. 18, No. 5, 1075, pp. 1315–1317.

M. H. Bosier, "Door Opening Mechanism for Magnetic Disk Cartridge", IBM Technical Disclosure Bulletin, vol. 22, No. 6, Nov. 1979, pp. 2501–2504.

W. J. Rueger et al., "Cartridge-opening Device", IBM Technical Disclosure Bulletin, vol. 26, No. 6, Nov. 1983, pp. 2993–2994.

M. E. Richard, "Door Opening and Ejection Lever for Magnetic Media Cartridges", IBM Technical Disclosure Bulletin, vol. 26, No. 7B, Dec. 1983, pp. 3812–3813.

R. P. Crawford, "Tape Cartridge", IBM Technical Disclosure Bulletin, vol. 28, No. 4, Sep. 1985, p. 1545.

English Language Abstract of Japanese patent document JO4256603 for "Recording Median Loading/Unloading Control for Large Capacity Storage" (Japanese Patent Info. Org.).

English Language Abstract of Japanese Patent Document J63205876 for "Tape Cartridge" (Japanese Patent Inf. Orig.).

English Language Abstract of Japanese Patent Document J62223848 for "Door Body Opening/Closing Device for Housing in Magnetic Tape Device" (Japanese Patent Info. Org.).

English Language Abstract of Japanese Document J54053511, for "Tape Cartridge", (Japanese Patent Info. Org.).

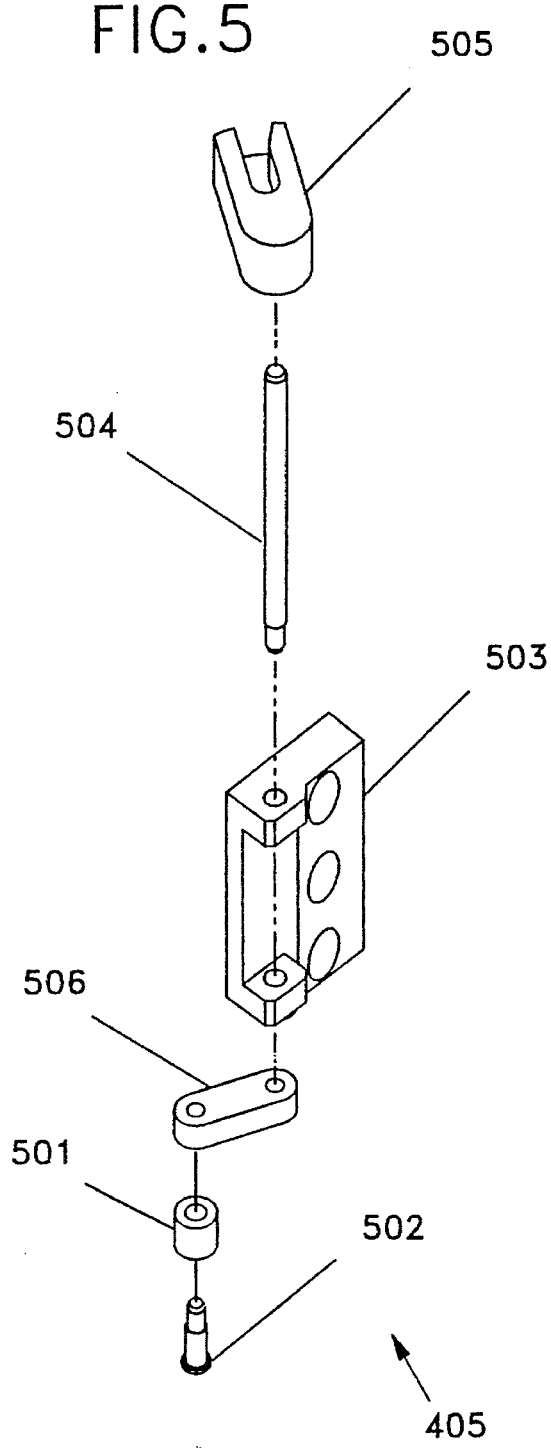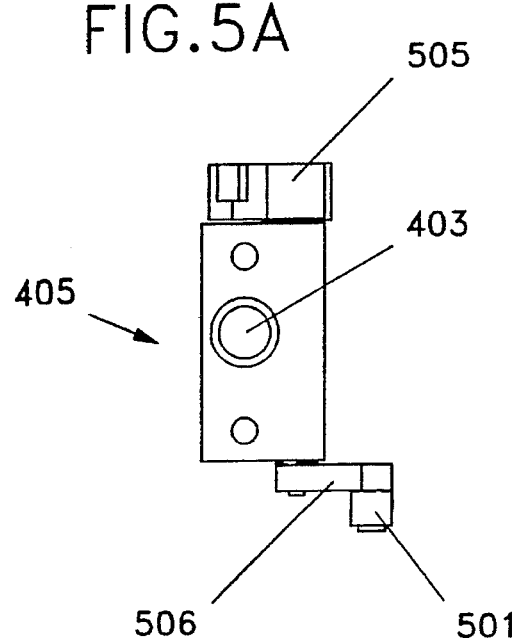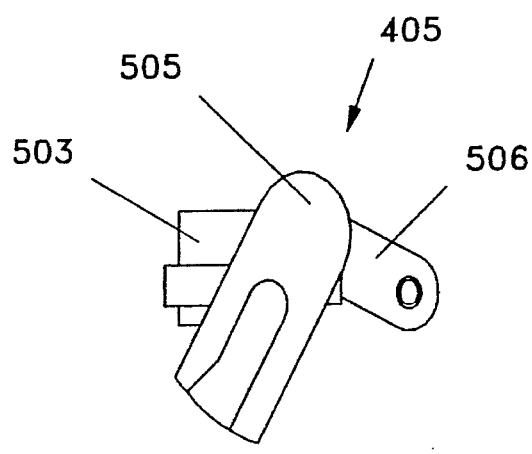

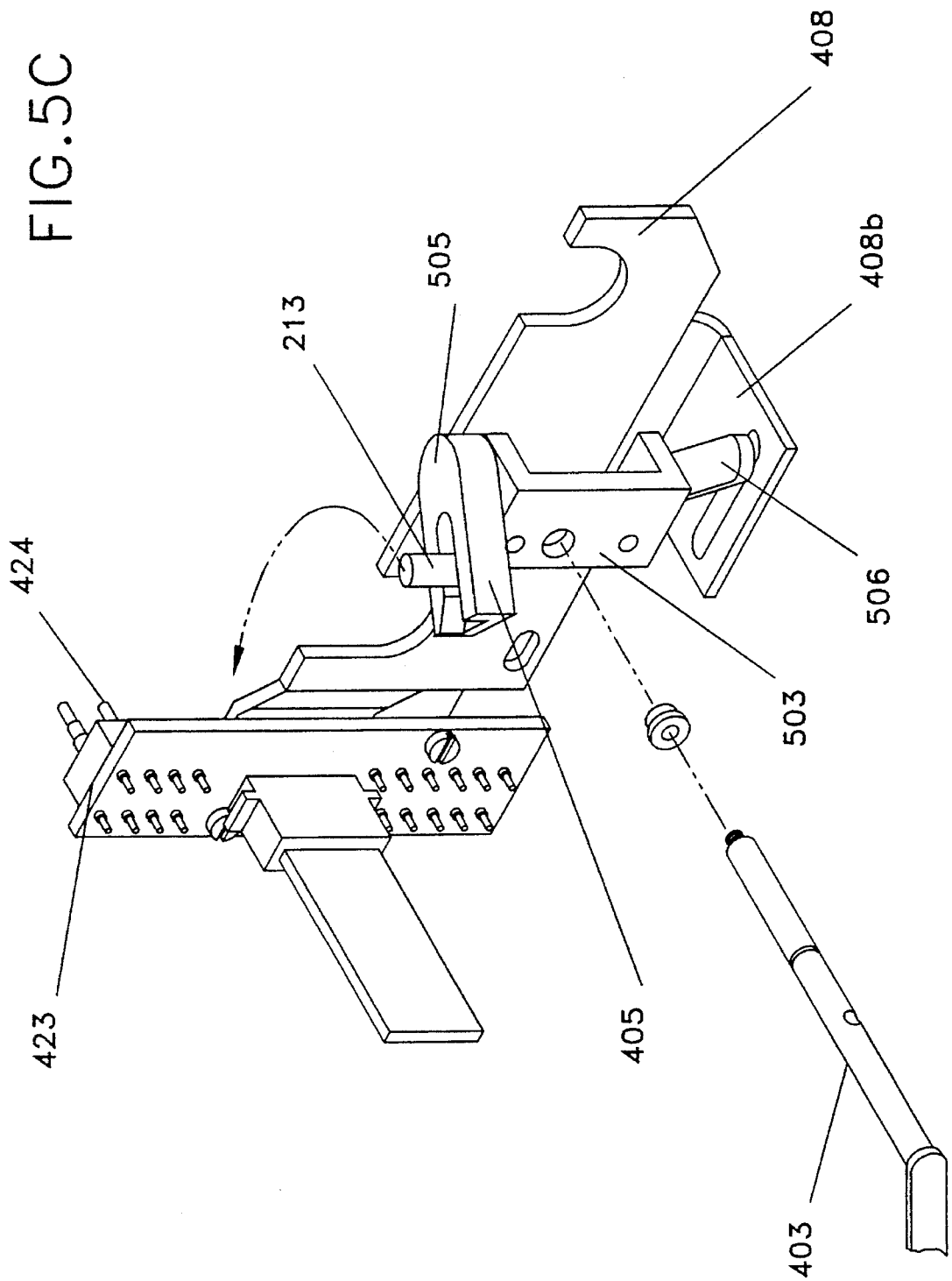

AUTOMATIC LOADER MECHANISM FOR MAGNETIC TAPE CARTRIDGE WITH TENSION CONTROL

BACKGROUND OF THE INVENTION

1. Field of the Invention

The present invention relates to the storage and retrieval of data on magnetic tape, and more particularly, to a tape drive for automatic insertion, registration and ejection of a tape cartridge of the type having dual hub driven reels and a tape access door on a forward end which pivots about an axis perpendicular to a rigid mount plate of the cartridge.

2. Description of the Related Art

Magnetic tape has long been used as a storage media for audio, video and computer information. Tape cartridges have been used extensively because they provide a convenient way to house and support a length of magnetic tape for engagement by a transducer in a tape drive while protecting the tape upon removal of the cartridge. Tape cartridges with dual reels are widely used because they eliminate the need to thread a leader outside the cartridge or utilize an endless loop single reel arrangement. Examples of dual reel tape cartridges that have been extensively commercialized are the Phillips cassette used for audio recording, the VHS cassette used for video recording, and the DC600 data cartridge used for back-up storage of computer data files stored on hard disk drives. The latter data cartridge is disclosed in U.S. Pat. No. 3,692,255 of Von Behren assigned to Minnesota Mining and Manufacturing Corporation.

An improved magnetic tape cartridge particularly well suited for high capacity computer data storage is disclosed in U.S. Pat. No. 5,294,072 of Don G. East, et al. assigned to International Business Machines Corporation. That cartridge includes dual hub driven reels which lock upon disengagement with drive clutch assemblies and a pivoting tape access door with a pseudo-head for improved tape tension control. This eliminates the need to fully rewind the tape before reading or writing data which delays access to data with cartridges such as those embodying the invention of the aforementioned U.S. Pat. No. 3,692,255.

It would be desirable to provide a tape drive that utilizes the improved magnetic tape cartridge of the aforementioned U.S. Pat. No. 5,294,072. Preferably such a tape drive should include an automatic loader mechanism for fast and reliable insertion, registration and ejection of the improved magnetic tape cartridge. The loader mechanism must also be capable of opening the tape access door and registering a transducer with the tape. It is critical that the loader mechanism accurately register the tape cartridge at unique datum locations to provide repeatability in reading and writing multi-track data recorded at high densities and to enable exchange of data between different drives. The automatic loader mechanism must not be unduly complex in order to minimize failures and reduce manufacturing costs. It must also preferably be small enough to fit within the industry standard and five and one-quarter inch form factor for peripheral storage devices. No prior art tape drive has heretofore been developed with a cartridge loader mechanism adapted to achieve these objectives with the improved magnetic tape cartridge of the aforementioned U.S. Pat. No. 5,294,072.

SUMMARY OF THE INVENTION

It is therefore the primary object of the present invention to provide a loader mechanism for automatic insertion, registration and ejection of a tape cartridge of the general type disclosed in U.S. Pat. No. 5,294,072 of Don G. East, et al.

Accordingly, the present invention provides a loader mechanism for a generally rectangular tape cartridge having a rigid mount plate for precision registration, a box-like cover secured to the mount plate, and a pair of reels mounted between the mount plate and the cover. The tape cartridge has a pair of hubs accessible through openings in the cover adapted to be engaged by clutch assemblies for unlocking and rotating the reels. A length of magnetic tape is wound about the reels and extends along a tape path adjacent a forward end of the cartridge. A tape access door at the forward end of the cartridge is pivotable about an axis perpendicular to the mount plate. It opens a tape access opening in the forward end of the cartridge to permit a head to engage an exposed segment of the tape. The loader mechanism itself comprises a carriage assembly for slidingly receiving the tape cartridge. The carriage assembly is supported on a base assembly for forward and rearward movement along a cartridge insertion axis. The loader mechanism further comprises a door opener mechanism for opening the tape access door of the tape cartridge as the cartridge is slid forwardly into the carriage assembly. After the tape access door has been opened the carriage assembly is automatically moved forward to carry the cartridge forward and engage the exposed segment of the tape in the cartridge with a head. The loader mechanism further includes a clutch retraction assembly mounted on the base assembly. The clutch retraction assembly includes a pair of rotatably supported clutch assemblies, a pair of reel motors each drivingly connected to a corresponding one of the clutch assemblies, and mechanisms for automatically moving the clutch assemblies transverse to the cartridge insertion axis to engage the clutch assemblies with the reel hubs of the tape cartridge.

BRIEF DESCRIPTION OF THE DRAWINGS

FIG. 5 is an enlarged exploded perspective view of the retraction linkage assembly visible in FIG. 4.

FIG. 5A is a side elevation view of the retraction linkage assembly components of FIG. 5 in their assembled state.

FIG. 5B is a top plan view of the retraction linkage assembly components of FIG. 5A.

FIG. 5C is an enlarged exploded perspective view of the manner in which the retraction link assembly cooperates with the retractor plate and the retraction guide shaft.

Throughout the drawing figures, like reference numerals refer to like parts, unless otherwise indicated. Within each figure, except for FIG. 17, the parts illustrated have been drawn in the proper scale relative to each other.

DETAILED DESCRIPTION OF THE PREFERRED EMBODIMENT

1. The Prior Art Tape Cartridge

Figure 8:
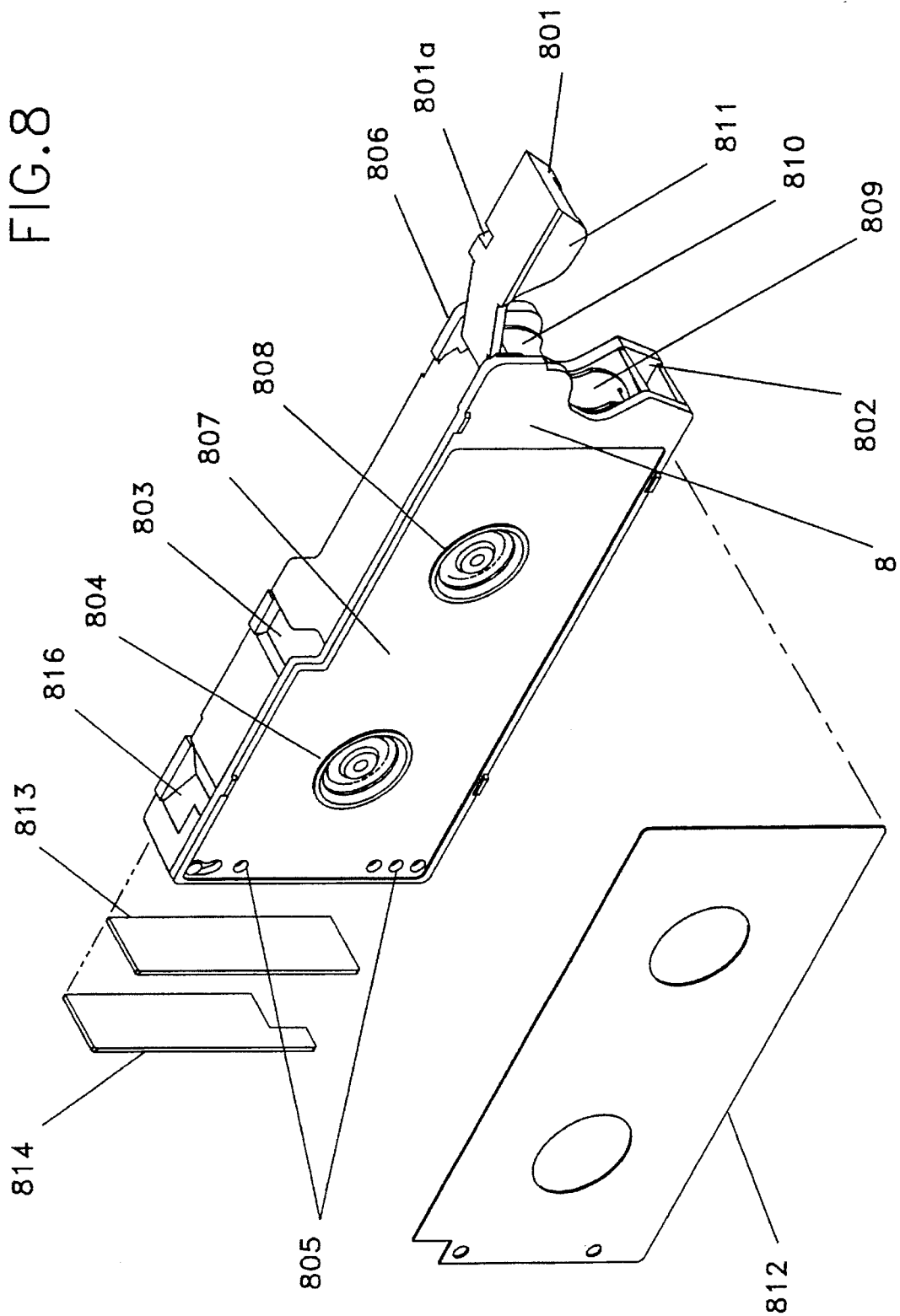
FIG. 8 is an exploded perspective view of the prior art magnetic tape cartridge with improved tension control which is shown fully inserted into the loader mechanism of FIG. 1.

FIG. 8 is an exploded perspective view of the prior art magnetic tape cartridge 8 with improved tension control which is described in detail in the aforementioned U.S. Pat. No. 5,294,072, the entire disclosure of which is specifically incorporated herein by reference. The loader mechanism of the present invention is specifically designed to be utilized with this tape cartridge. Therefore, the construction of this tape cartridge will first be summarized.

The tape cartridge 8 (FIG. 8) includes a generally rectangular housing formed by a rigid Aluminum mount plate 806 and a box-like molded plastic cover 807. The cover 807 includes a pair of holes exposing two toothed tape reel hubs 804 and 808. A length of magnetic tape (not shown) is wound between the tape reels (not shown) inside the plastic cover 807.

A forward end of the tape cartridge 8 (FIG. 8) is provided with a tape access door 801 which pivots about an axis substantially perpendicular to the plane of the mount plate 806. The tape access door 801 is shown pivoted to its open position in FIG. 8, thereby exposing a segment of the magnetic tape (not shown) through a head access opening formed in the forward end of the plastic cover 807. The door 801 is biased to its closed position by a torsion spring (not shown) journaled about the pivot shaft of the door 801. A slot 801a is formed on one side of the door 801 for engagement by a pin of a door opener mechanism. The magnetic tape rides around and between a pair of tape guides 809 and 810 secured to the mount plate 806.

The inside of the tape access door 801 (FIG. 8) is provided with a pseudo-head 811. When the tape access door 801 is in its closed position, the pseudo-head 811 occupies the space otherwise occupied by the tape transducer or head of a tape drive when the head is mated with the exposed segment of magnetic tape. When the pseudo-head 811 engages the tape it prevents the tape from being drawn taught between the guides 809 and 810. When drive clutches described hereafter are disengaged from the reel hubs 804 and 808, the rotational position of the tape reels is locked. These two improvements maintain proper tape tension when the cartridge is removed from the tape drive.

The prior art tape cartridge 8 illustrated in FIG. 8 further includes a relatively large planar label 812 which overlies the plastic cover 807 and has holes for permitting access to the reel hubs 804 and 808. Optionally, a magnetic picker plate 813 is secured to a rear end of the tape cartridge 8 to facilitate automated removal of the tape cartridge from a tape cartridge library. A volume identification label 814 overlies the magnetic picker plate 813. The forward end of the tape cartridge 8 is provided with a cartridge registration opening 802 in addition to the tape access opening which is opened and closed by the door 801. The mount plate 806 and cover 807 are formed with nesting features 815, a middle retention notch 803 and an automation gripper notch 816 along an upper side edge. Another retention notch (not visible) is formed on the lower side edge of the cartridge 8, opposite the middle retention notch 803. Machine readable four bid cartridge identification holes 805 are formed in the top surface of the cover 807 adjacent the rear end of the cartridge 8. A write enable switch 817 is also located in the corner of the cover 807 adjacent the rear end of the cartridge 8.

2. The Structure of the Automatic Loader Mechanism

Figure 1:
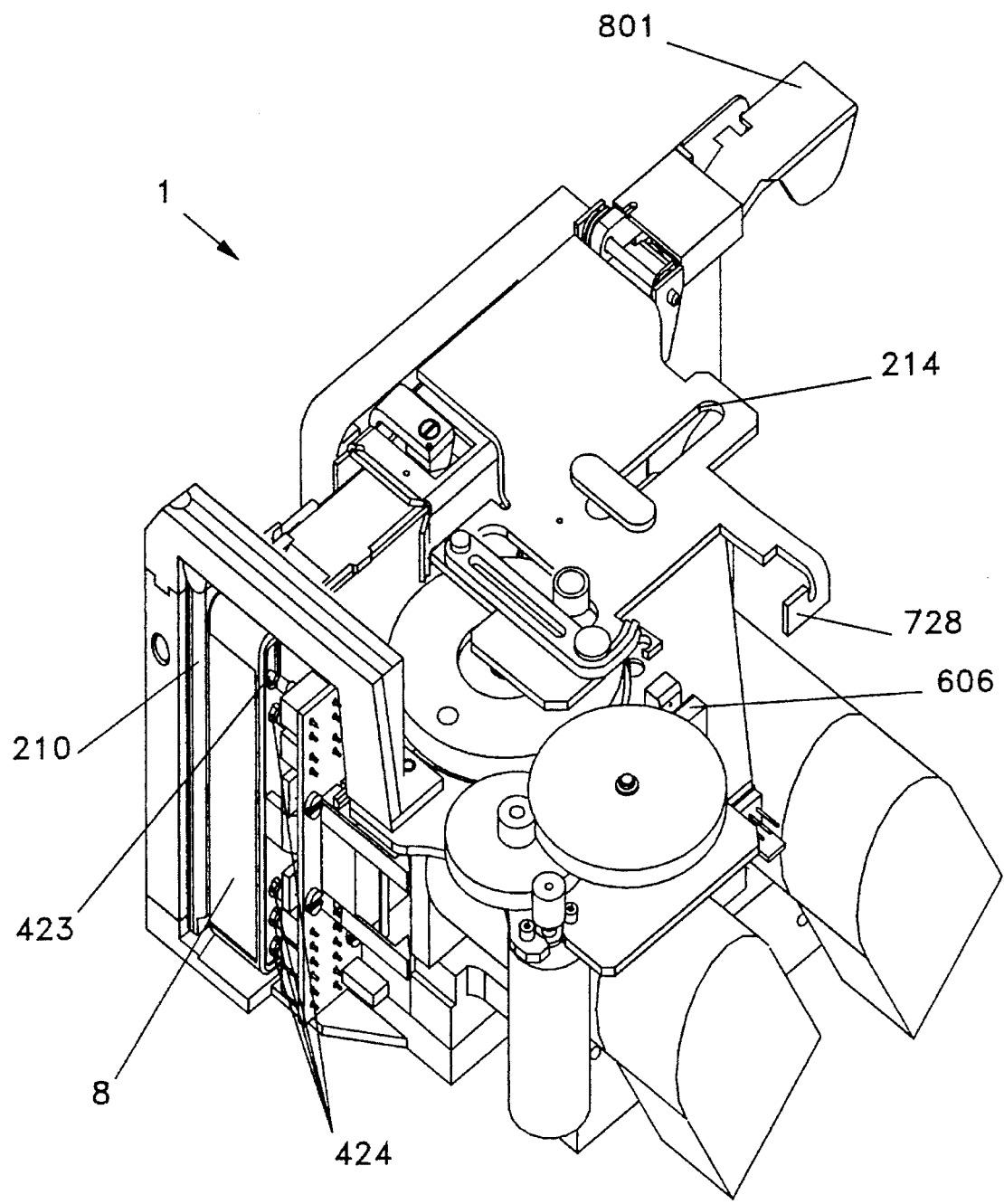
FIG. 1 is a perspective view of a preferred embodiment of the automatic loader mechanism of the present invention showing a magnetic tape cartridge with improved tension control fully inserted therein.

Referring to FIG. 1, a preferred embodiment 1 of the automatic loader mechanism of the present invention is illustrated showing the magnetic tape cartridge 8 fully inserted therein. The forward end of the cartridge 8 is inserted first and slid forwardly in a vertical orientation into a generally rectangular receptacle. The initial stage of the cartridge insertion is either done manually by a user or automatically by a picker of a tape library system. Subsequently, the second stage of cartridge insertion is done automatically by the loader mechanism.

Figure 2:
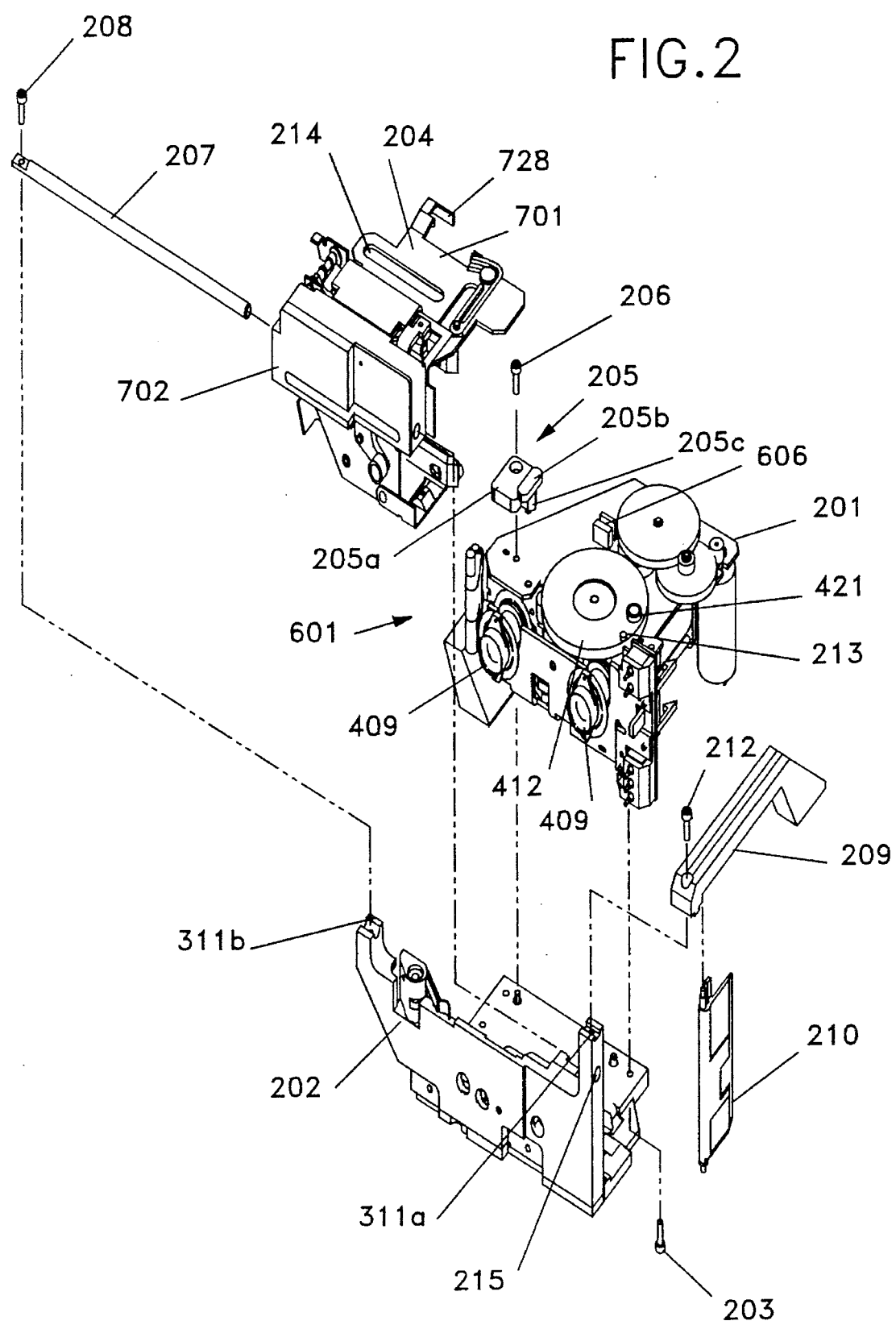
FIG. 2 is a somewhat reduced partially exploded view showing the principal subassemblies of the loader mechanism of FIG. 1 taken from an alternate perspective.
Figure 11:
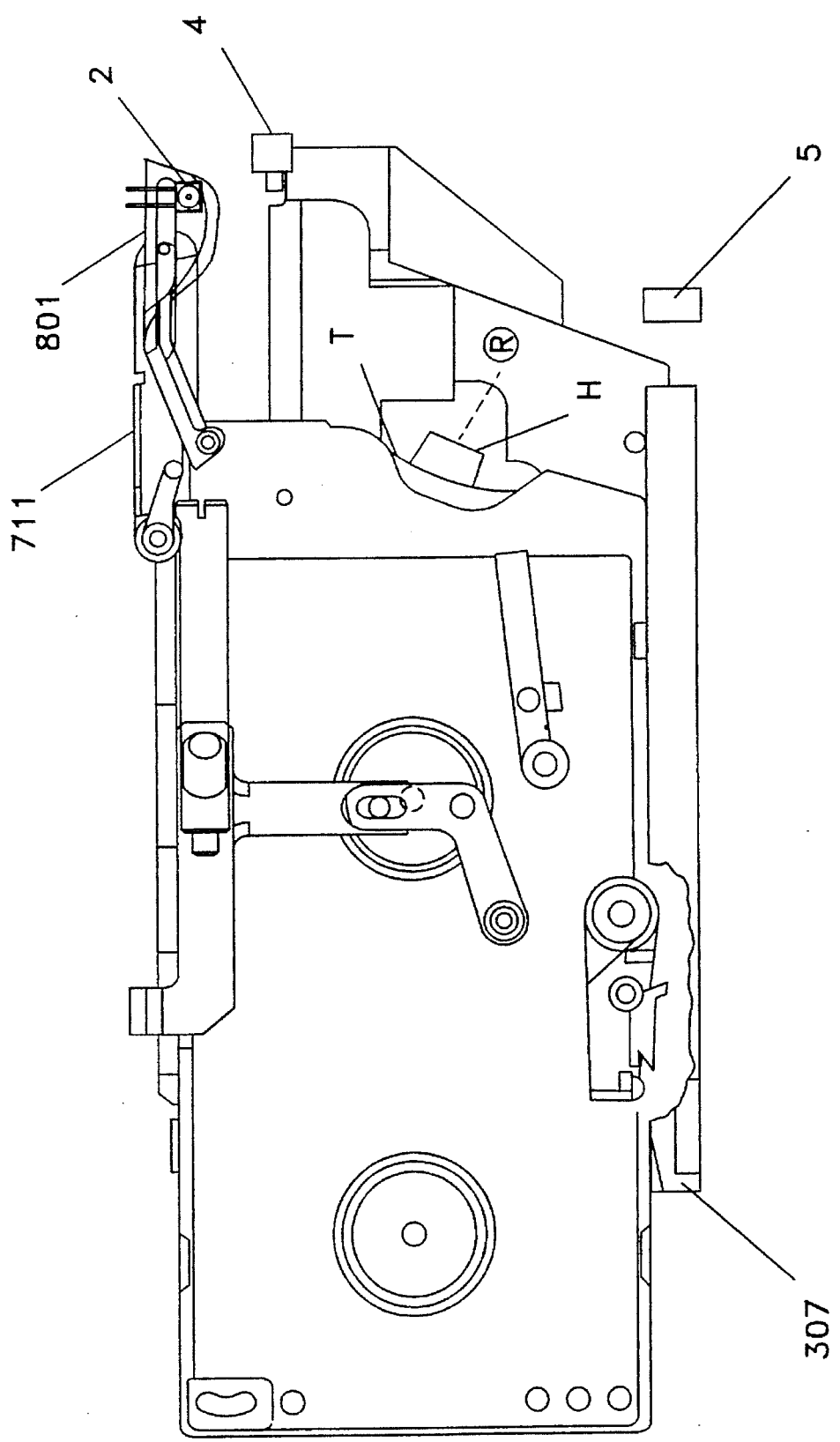

Referring to FIG. 2, the cartridge insertion receptacle is formed between a clutch retraction assembly 201, a base assembly 202 and a carriage assembly 204. When joined these three main assemblies provide a loader mechanism dimensioned to fit within the industry standard five and one-quarter inch form factor for disk drives, tape drives and optical storage drives. During insertion of the cartridge 8, its access door 801 is swung to its fully open position illustrated in FIG. 1, permitting a head H shown diagrammatically in FIG. 11 to engage an exposed segment of the magnetic tape T. Data is preferably recorded in multiple parallel tracks spaced across the width of the tape. The head may be any suitable transducer for reading and writing data longitudinally along the length of the tape. For example, a thin film, interleaved, multi-track magnetic transducing head may be used. The individual data tracks may be accessed by using inductive or magnetoresistive elements. The data may be recorded on the tape in any compatible format. There may be less sensing elements on the head than the total number of tracks and a head reciprocation mechanism R may be used to support the head for track selection as is well known in the art. Preferably the face of the head H is curved and the head is positioned to provide the proper wrap angle of the tape T around the face of the head. The shape of the pseudo-head 811 (FIG. 8) on the inside of the tape access door 801 preferably has the same contour as the face of the head H (FIG. 11).

The cartridge insertion slot of the loader mechanism 1 is closed, upon withdrawal of the cartridge 8, by a pivoting door 210 (FIG. 2). This door has upper and lower hinge pins which are received in corresponding holes formed in a secondarily datum 307 (FIG. 3) and a door clamp 209 (FIG.

2). The secondary datum 307 is secured to a cast metal base plate 301 (FIG. 3) of the base assembly 202 by a screw 306. The door clamp 209 is secured to a vertical post 311a of a clamping plate 311 of the base assembly 202 by a screw 212. The door 210 is biased by a torsion spring (not shown) toward a rotational position in which it covers the cartridge insertion slot after the cartridge 8 has been withdrawn therefrom. When the cartridge is inserted, the forward end of the cartridge swings the door to open the cartridge insertion slot and the cartridge slides past the door. The door 210 is contoured so that it rubs against the plastic door 801 of the cartridge 8 more than the Aluminum mount plate 806 of the cartridge, thereby reducing debri generation. The door 210 is preferably made of an electrically conductive material in order to drain static charges from the cartridge 8.

Referring again to FIG. 2, when the tape cartridge 8 is first inserted into the cartridge insertion slot, a pair of clutch assemblies 409 (FIG. 4) of the clutch retraction assembly 201 are retracted to permit the cartridge 8 to be fully slid into the carriage assembly 204 (FIG. 2). The clutch assemblies 409 are driven by corresponding reel motors 420 (FIG. 4) which are supported on a motor mount 401. The clutch assemblies 409 incorporate a high torsional stiffness, low axial deflection stiffness, flexible drive shaft design which is more fully described in co-pending U.S. patent application Ser. No. 08/074,898 filed Jun. 10, 1993 of T. R. Albrecth, et al. assigned to International Business Machines Corporation. The entire disclosure of the aforementioned U.S. patent application is specifically incorporated herein by reference. The currents to the reel motors 420 are controlled as is well known in the art to maintain constant tape tension. See for example U.S. Pat. No. 4,125,811 of Eige, et al.

The tape cartridge 8 initially slides forwardly with respect to the carriage assembly 204 (FIG. 2) and the tape access door 801 of the cartridge is opened. Thereafter, both the cartridge 8 and the carriage assembly 204 move forwardly a predetermined distance. The carriage assembly 204 then continues to move forwardly while further movement of the cartridge 8 is prevented by registration with datums hereafter described. After a cam assembly 412 (FIG. 4) moves the carriage assembly 204 forwardly, the clutch retraction assembly 201 (FIG. 2) is energized to transversely move the clutch assemblies 409 (FIG. 4) into engagement with the reel hubs 804 and 808 (FIG. 8) of the tape cartridge 8.

Figure 4:
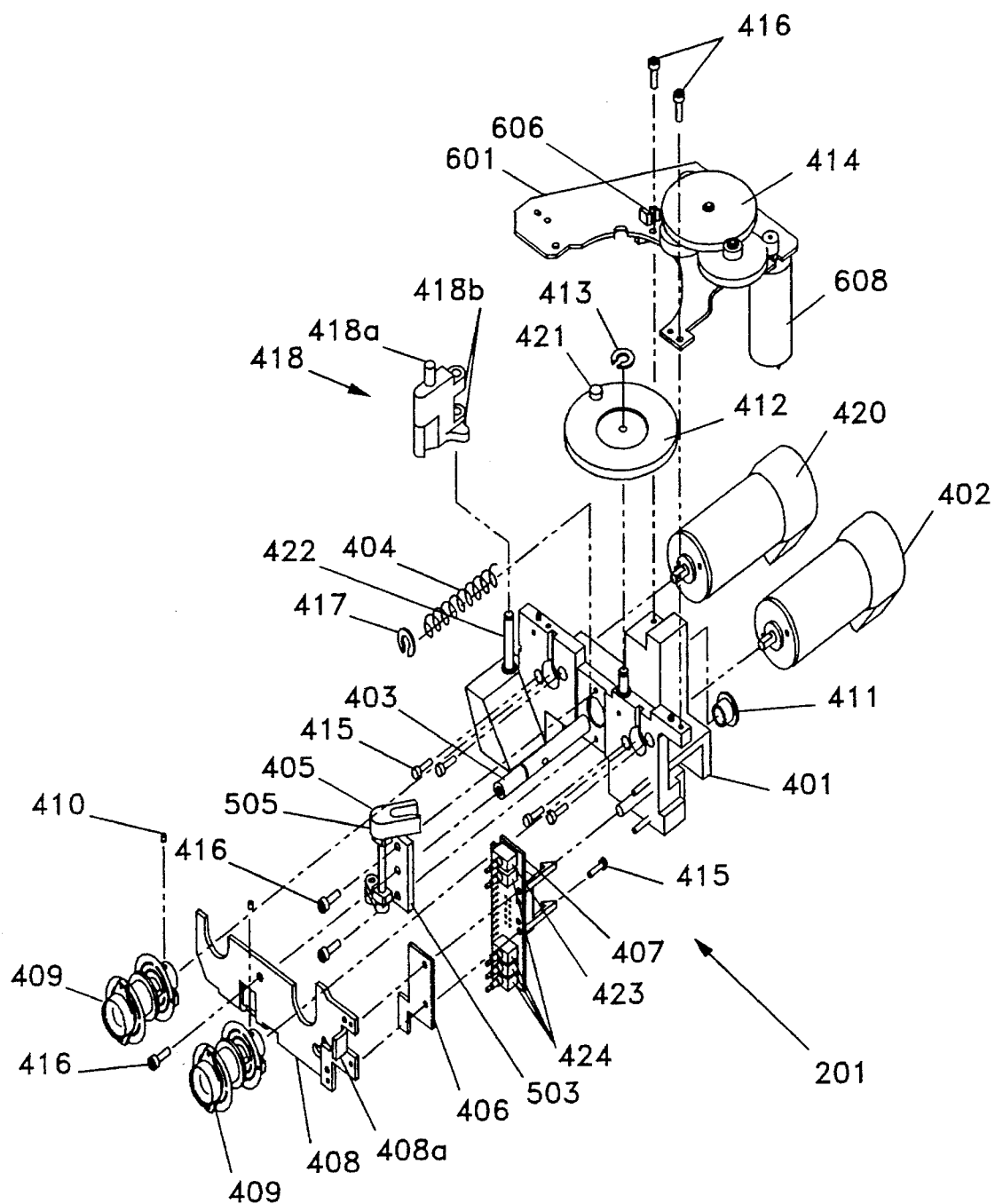
FIG. 4 is an exploded perspective view of the clutch retraction assembly components of the loader mechanism shown in FIG. 2.
Figure 6:
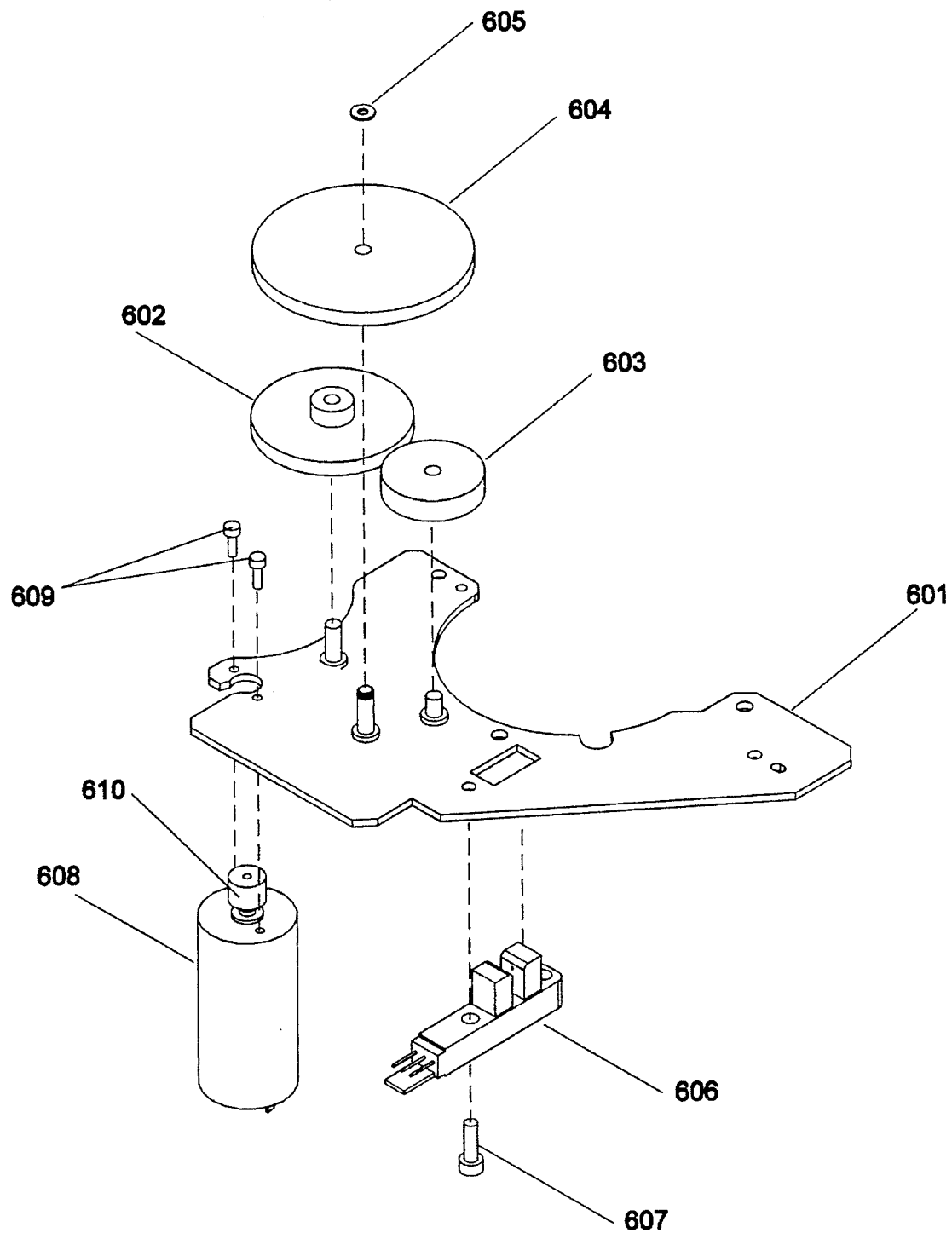
FIG. 6 is an enlarged exploded perspective view of the motor deck assembly components taken from the opposite side of FIG. 2.

The cam assembly 412 (FIG. 4) is rotated by a motor deck assembly 414 (FIG. 4). As best seen in FIG. 6, the motor deck assembly 414 includes a loader motor 608 which drives the cam assembly 412 through a reduction gear train. The motor 608 also translates or moves the carriage assembly. This gear train includes a cluster gear 602, an idler gear 603 and a cluster gear 604. The cluster gear 602 is driven by a pinion gear 610 mounted on the end of the shaft of the motor 608.

Figure 3:
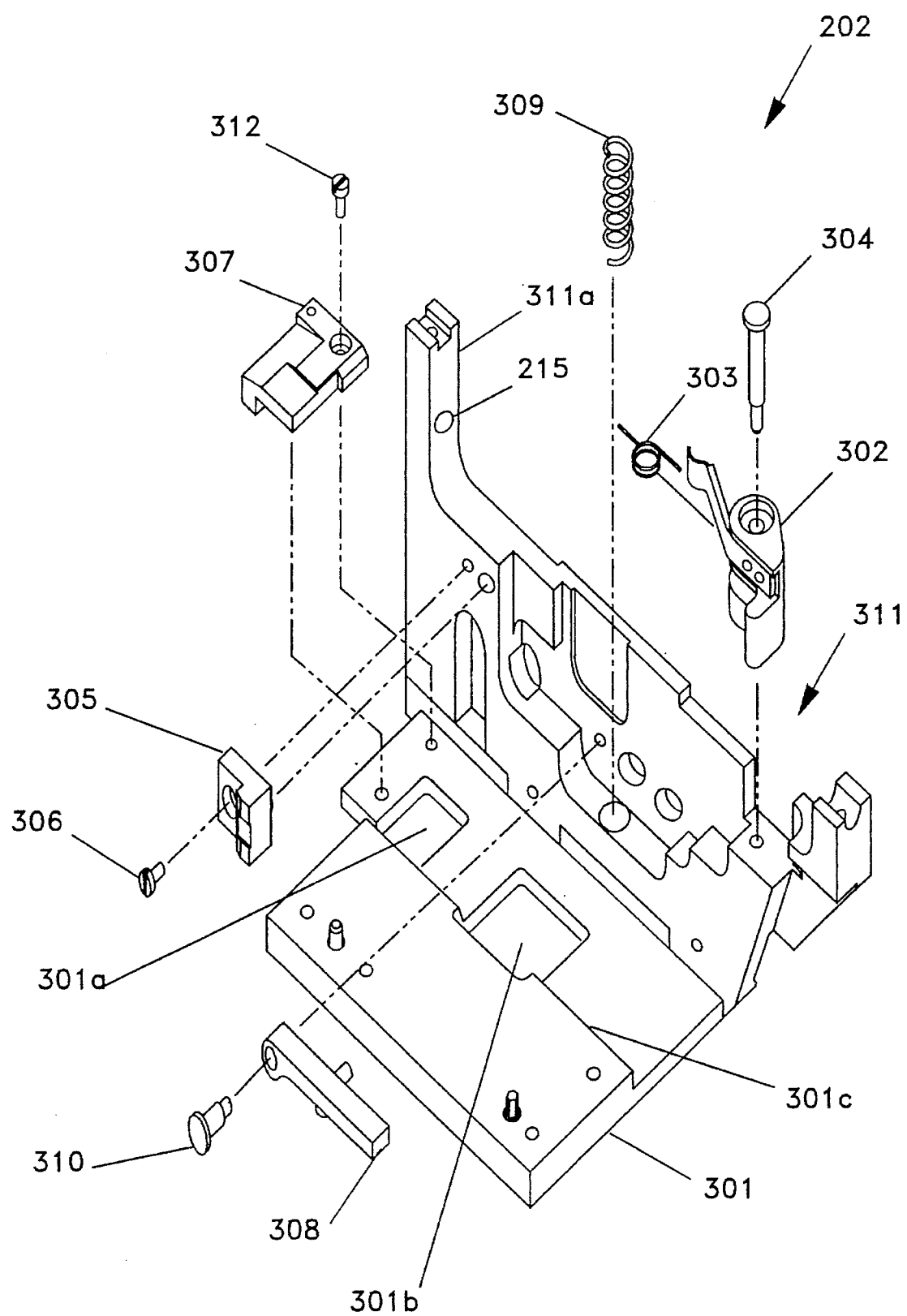
FIG. 3 is an exploded perspective view of the base assembly components of the loader mechanism taken from the opposite side of FIG. 2 and drawn to a slightly larger scale.

Details of the clutch retraction assembly 201 are shown in FIG. 4. A cast metal motor mount 401 is rigidly secured to the horizontal cast metal base plate 301 (FIG. 3). The reel motors 420 are secured to a vertically extending flange of the motor mount 401. The drive shafts of these motors extend through corresponding holes in this vertical flange. A stamped metal frame 601 (FIG. 6) of the motor deck assembly 414 is secured to the motor mount 401 by screws 416. The frame 601 serves as a supporting platform for the motor 608, as well as the previously described gear train including gears 602, 603 and 604. An optical emitter/detector home position sensor 606 is also mounted to the frame 601. A flange 728 (FIG. 7) of the carriage assembly 204 is positioned to intercept the beam of the emitter/detector home position sensor 606 to trigger the de-energization of the motor 608 and thereby limit the rearward motion of the carriage assembly 204 along the direction of the cartridge insertion axis. The alignment of the flange 728 and the home position sensor 606 is visible in FIG. 1.

The clutch assemblies 409 (FIG. 4) are rotatably supported in corresponding arcuate recesses in the retractor plate 408 and are coupled to corresponding shafts of the reel drive motors 420. The retractor plate 408 is secured by a screw 416 to the end of a retraction guide shaft 403. The retraction guide shaft 403 slides through a hole in a bearing block 503 of a retraction link assembly 405 (FIGS. 4 and 5) and through a retractor bearing 411 mounted between the reel motors 420. A compression spring 404 surrounds the retraction guide shaft 403 and is compressed between an E-clip 417 fixed about the retraction guide shaft 403 and the retractor bearing 411.

The upper side of the cam assembly 412 is provided with a first bearing surface in the form of a follower bearing 421 which is received in an elongate slot 729 (FIG. 7) in the horizontal leg of an L-shaped carriage frame 701. The slot 729 which extends transverse to the cartridge insertion axis. Upon rotation of the cam assembly 412 the arcuate motion of the follower bearing 421 will cause the carriage assembly 204 to move along the cartridge insertion axis either forwardly or rearwardly, depending upon whether the cam assembly 412 rotates clockwise or counter-clockwise.

A plastic follower lever 721 (FIGS. 1 and 7) is mounted to the horizontal leg of the carriage frame 701 adjacent the slot 729. The follower bearing 421 engages the follower lever 721. A coil spring 720 (FIG. 7) has one end connected to the remote end of the follower lever 721. The other end of the coil spring 720 is connected to a hole 730 in the horizontal leg of the carriage frame 701. The function of the spring 720 is to pull the carriage assembly 204 rearwardly if the carriage assembly is not locked into position and the tape cartridge 8 is withdrawn rearwardly therefrom.

A second bearing surface in the form of a post 213 (FIG. 2) extends from the underside of the cam assembly 412. This post is received in a grooved receiver 505 (FIGS. 4 and 5) of the retraction link assembly 405. Rotation of the cam assembly 412 moves the clutch assemblies 409 transverse to the cartridge insertion axis to engage and disengage the clutch assemblies with the reel hubs 804 and 808 (FIG. 8) of the tape cartridge 8. In a prototype of the illustrated loader mechanism, the amount of transverse motion of the clutch assemblies is less than five millimeters. The clutch assemblies 409 can accommodate this mount of axial expansion and contraction while still maintaining driving connection with the shafts of the reel motors 420.

Details of the retraction link assembly 405 are illustrated in FIGS. 5, 5A and 5B. The bearing block 503 has a pair of holes for receiving a pivot shaft 504 therethrough. The receiver 505 is rigidly secured to the upper end of the pivot shaft 504. The lower end of the pivot shaft 504 is rigidly secured in a hole in one end of an arm 506. A pin 502 extends through a roller 501 and is rigidly secured in a hole in the other end of the arm 506. The roller 501 is used to secure the lower end of the retraction link assembly 405 to a slotted tab 408b (FIG. 5C) bent horizontally from the bottom edge of the retractor plate 408. The roller 501 moves in the slot in the tab 408b. It is important that the components of the retraction link assembly 405 be assembled into the angular relationship depicted in FIG. 5B. This ensures that the clutch assemblies 409 are engaged and disengaged with the reel hubs 804 and 808 of the tape cartridge 8 in the appropriate time sequence.

A rectangular plastic carriage guide 205 (FIG. 2) is rigidly secured to the frame deck 601 by a screw 206. The carriage guide 205 includes a lower rectangular base portion 205a and an rectangular upper tab portion 205b which are connected by a vertical post portion 205c. The base portion 205a is fixed to the frame deck 601 below the horizontal leg of the carriage frame 701. The post portion 205c extends through a slot 214 formed in the carriage frame 701. The upper tab portion 205b extends across portions of the carriage frame 701 adjacent the slot 214. The slot 214 extends parallel with the cartridge insertion axis. As the cam assembly 412 rotates and the follower bearing 421 travels in the transverse slot 729 (FIG. 7), the portions of the carriage frame 701 defining the slot 214 slide past the post portion 205c of the carriage guide 205 to maintain the alignment of the carriage assembly. The tab portion 205b prevents torquing or rotation of the carriage assembly which might otherwise result during the cartridge registration clamping hereafter described in detail.

The components of the base assembly 202 (FIG. 2) of the preferred embodiment of our automatic loader mechanism are best seen in FIG. 3. They include the horizontally disposed, solid cast metal base plate 301 which is screwed or otherwise secured along one side edge thereof to the lower edge of the vertical cast metal clamping plate 311. A primary clamp 302 is pivotally secured to the clamping plate 311 by a vertical clamp pivot pin 304 which extends therethrough. The primary clamp 302 is biased away from the cartridge by a torsion spring 303. One end of a ramp press 308 is pivotally secured to the clamping plate 311 intermediate its length by a horizontal ramp pivot pin 310 which extends therethrough. A coil spring 309 is compressed between the ramp press 308 and a shoulder of the clamping plate 311. A primary datum 305 is secured to the vertical sidewall of the clamping plate 311, adjacent its forward edge, by a screw 306. A secondary datum 307 is screwed to the horizontal base plate 301 adjacent its forward edge by a screw 312.

Figure 7:
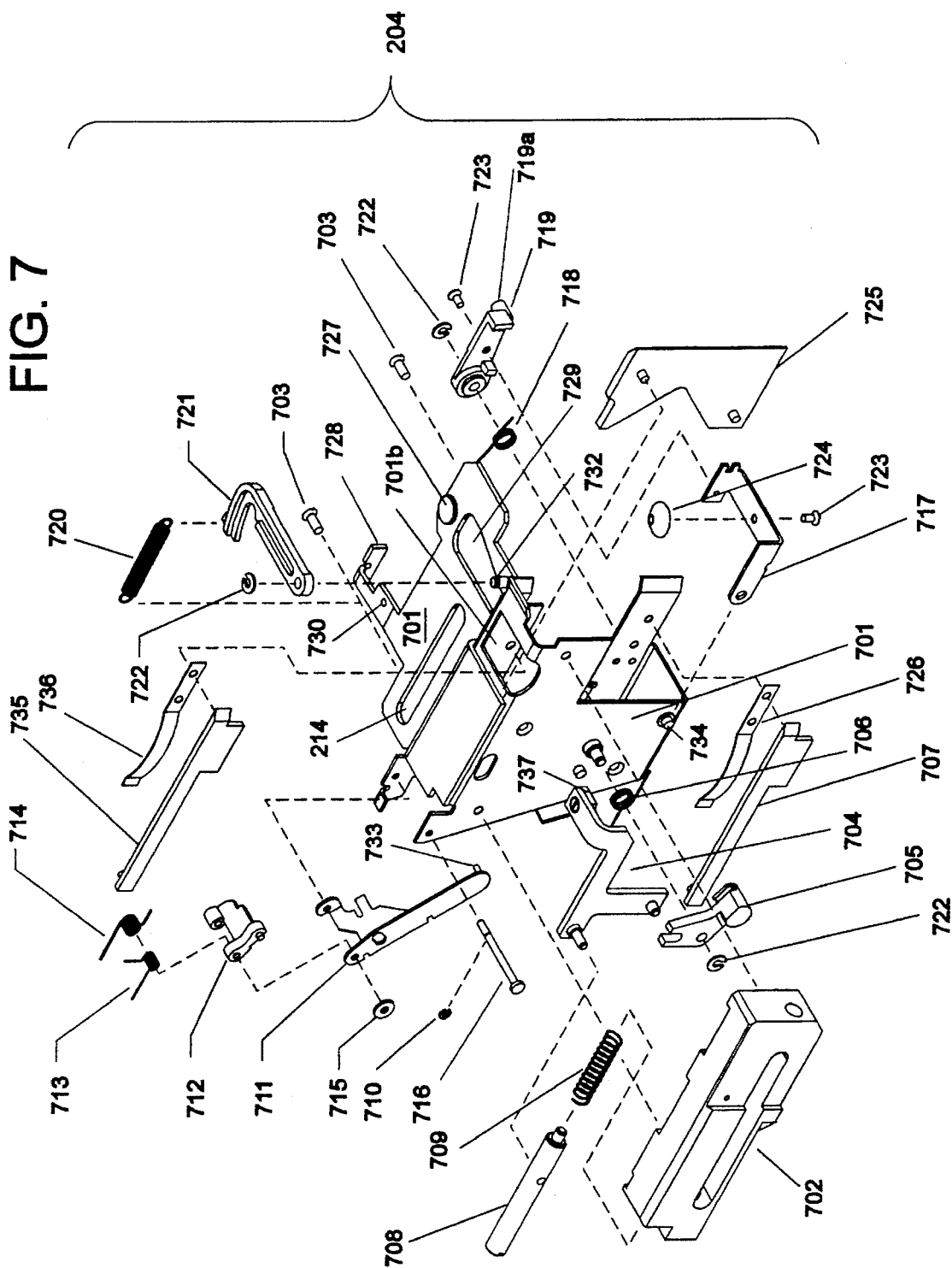
FIG. 7 is an enlarged exploded perspective view of the carriage assembly components shown in FIG. 2.

Details of the carriage assembly 204 are illustrated in the enlarged exploded perspective view of FIG. 7. The main portion of the carriage assembly 204 is comprised of the L-shaped carriage frame 701. The carriage frame 701 is formed from sheet metal. The slots 214 and 729 are both formed in horizontal leg of the carriage frame 701. One end of the plastic follower lever 721 has a hole which fits over a post 732 extending upwardly from the carriage frame 701. An E-clip 722 is connected over the upper end of the post 732 to hold this end of the follower lever 721 in position. A flanged pin 727 (FIGS. 1 and 7) extends over the portion of the L-shaped follower lever 721 where its two legs join. The pin 727 secures this portion of the follower lever 721 to the carriage frame 701.

A plastic bearing block 702 (FIG. 7) is secured to the outside of the vertical leg of the L-shaped carriage frame 701. As best seen in FIG. 2, the bearing block 702 has a pair of holes formed in either end for slidably receiving a horizontal carriage shaft 207 therethrough. The rearward end of the carriage shaft 207 is seated in a hole 215 in the vertical post 311a of the clamping plate 311. The forward end of the carriage shaft 207 is flattened and has a hole therethrough for receiving a screw 208 which threads into another vertical post 311b of the clamping plate 311. The bearing block 702 supports the L-shaped carriage frame 701 for sliding motion along the cartridge insertion axis, both forwardly and rearwardly. A clamp arm 704 (FIG. 7) is pivotally connected to a slider shaft 708 which slides within a recess inside the bearing block 702 and is biased by a compression spring 709.

A door opener frame 711 has its rear end pivotally mounted to the carriage frame 701 by a horizontal pivot shaft 716. The forward end of the door opener frame 711 has a horizontally extending pin 733 which is slidably received inside the slot 801a (FIG. 8) of the tape access door 801. This enables the door opener frame 711 to open the tape access door 801 as the cartridge 8 is slid forwardly through the carriage frame 701. A plastic opener bearing 712 is mounted on the same pivot shaft 716 as the rear end of the door opener frame 711. The opener bearing 712 pushes against the edge of the rigid Aluminum mount plate 806 of the tape cartridge 8 to provide a fulcrum that facilitates the opening of the door. A torsion spring 713 is also mounted on the pivot shaft 716. The spring 713 biases the opener bearing 712 counter-clockwise in FIG. 7 viewed from the outside of the carriage assembly 204. The opener bearing 712 is mounted inside of the rear end of the door opener frame 711. Another torsion spring 714 is mounted on the pivot shaft 716 and biases the door opener frame 711 in a counter-clockwise direction in FIG. 7 viewed from the outside of the carriage assembly 204. This arrangement facilitates opening of the tape access door 801 of the tape cartridge 8 as it is slid forwardly through the carriage assembly 204. Upon withdrawal of the tape cartridge rearwardly from the carriage assembly 204, the door opener structure just described ensures that the tape access door 801 is closed. Further details of the tape access door opening mechanism are disclosed in co-pending U.S. patent application Ser. No. 08/229,968 filed on even date herewith of A. J. Argumedo, et al. entitled "Door Opening Mechanism for Magnetic Tape Cartridge with Tension Control". Said application is also assigned to International Business Machines Corporation. The entire disclosure of the aforementioned U.S. patent application of A. J. Argumedo, et al. is specifically incorporated herein by reference.

A U-shaped lock bracket 717 (FIG. 7) has one leg pivotally secured to a post 734 extending outwardly from the lower end of the vertical leg of the L-shaped carriage frame 701. The other leg of the lock bracket 717 is secured to the intermediate portion of a lock bearing 719 by a screw 723. The inner end of the lock bearing 719 has a hole for receiving therethrough another pivot post (not visible) connected to an inner guide bracket 701a of the carriage frame 701. A torsion spring 718 biases the lock bearing 719 downwardly in a counter-clockwise direction in FIG. 7 viewed from the outside of the carriage assembly 204. A lock tooth 724 is secured to the upperside of the intermediate portion of the U-shaped lock bracket 717 by a screw 723. In the prototype of our invention, the tooth 724 was rectangular and not rounded. An E-clip 722 fits over the post on which the inner end of the lock bearing 719 is pivotally mounted. A vertical plastic guide plate 725 is connected to the carriage frame 701 on the side of the cartridge insertion slot opposite the inner guide bracket 701a.

A plastic linkage arm 705 (FIG. 7) is pivotally mounted to the vertical leg of the carriage frame 701 and cooperates with the clamp arm 704 as will become apparent later on. A torsion spring 706 biases the linkage arm 705 counter-clockwise in FIG. 7 viewed from the outside of the carriage assembly 204. The outer end of the linkage arm 705 has a groove for receiving and engaging a portion of the clamp arm 704. A plastic guide rail 707 and a metal leaf spring 726 are mounted to the inner guide bracket 701a. Another plastic guide rail 735 and metal leaf spring 736 are mounted to an upper inner vertical flange 701b of the carriage frame 701.

3. The Operation of the Automatic Loader Mechanism

Figure 9:
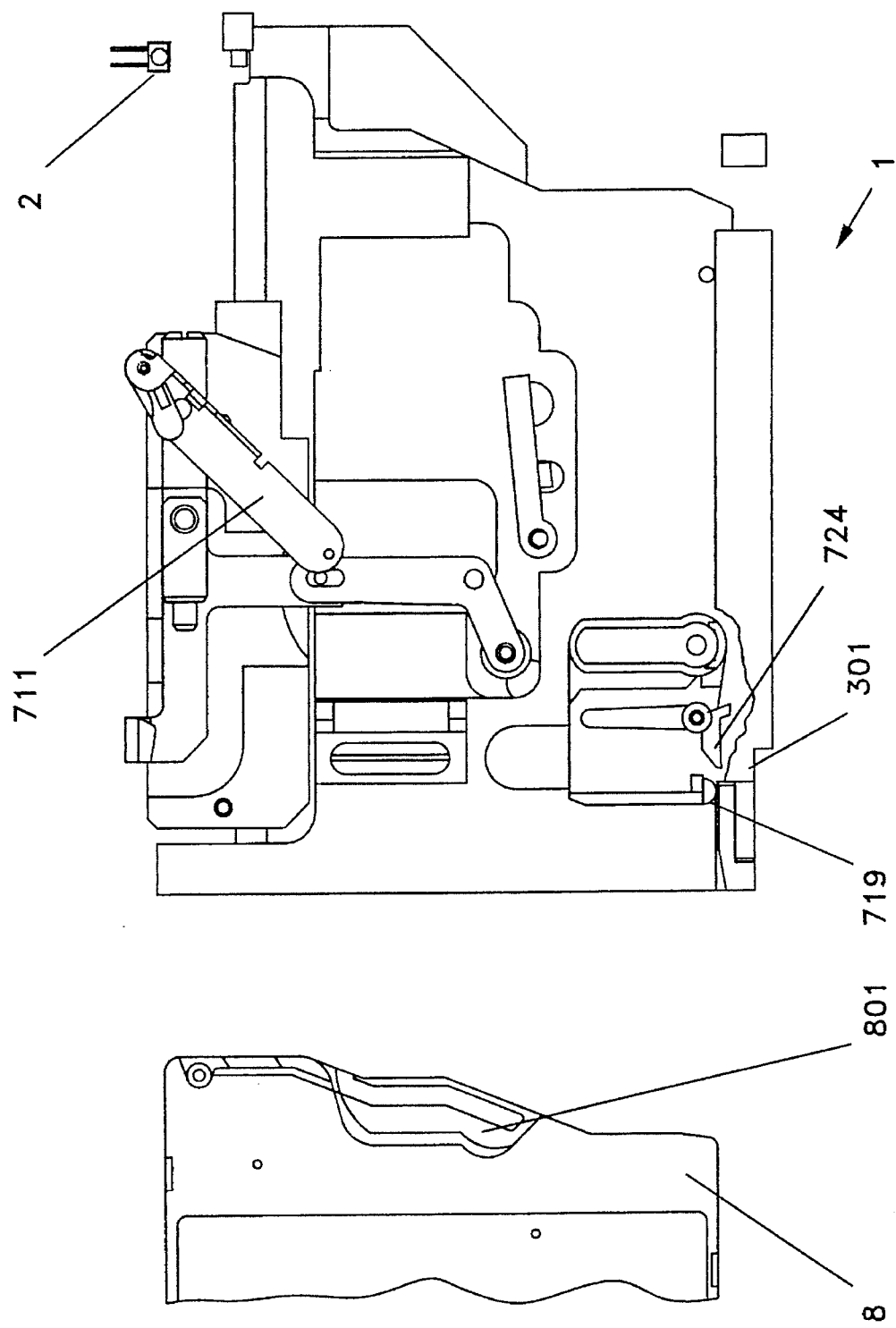
FIGS. 9–12 are a series of side elevation views of the carriage assembly of the loader mechanism of FIG. 1 illustrating the cartridge loading sequence.
Figure 10:
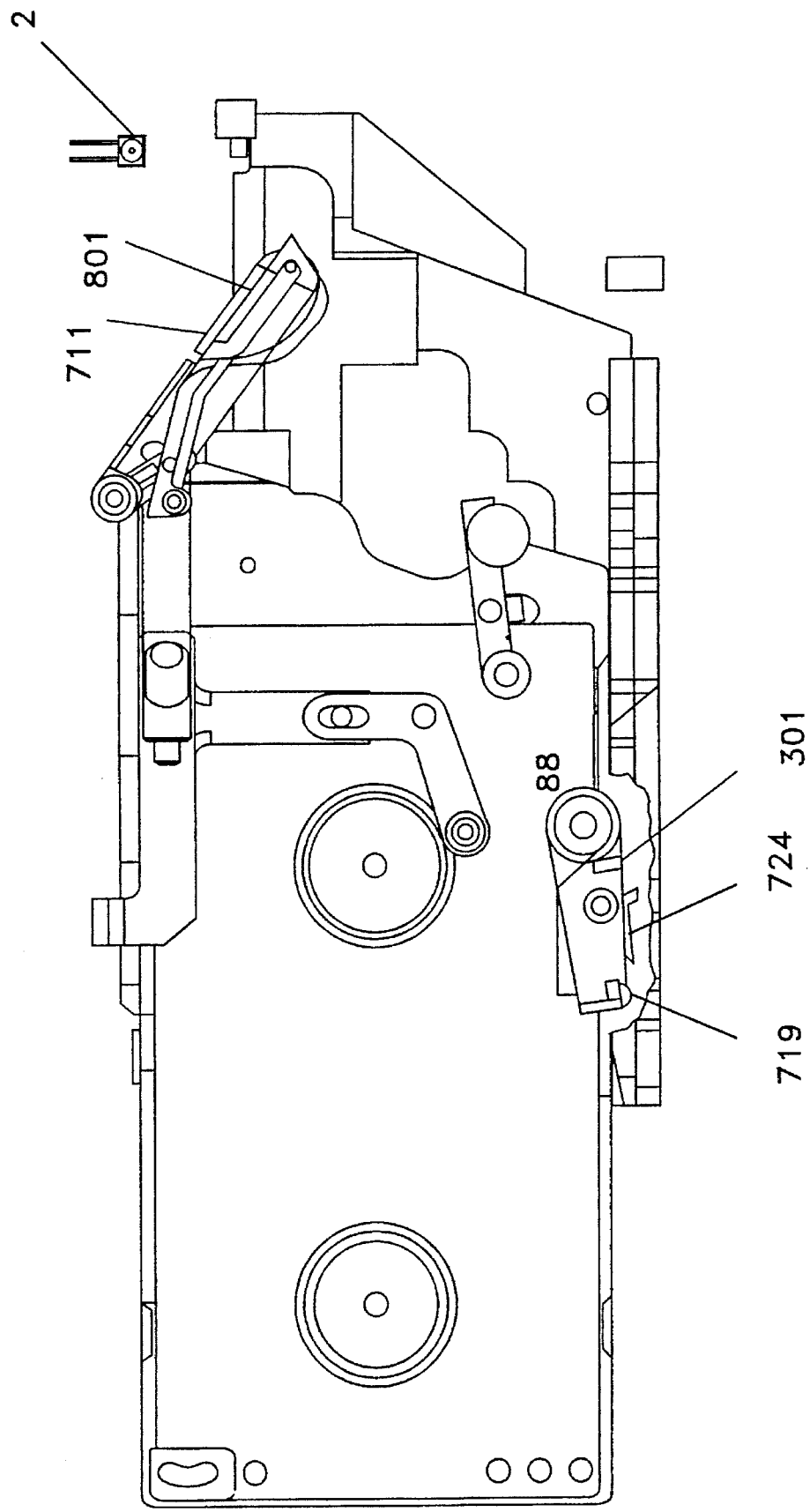
Figure 13:
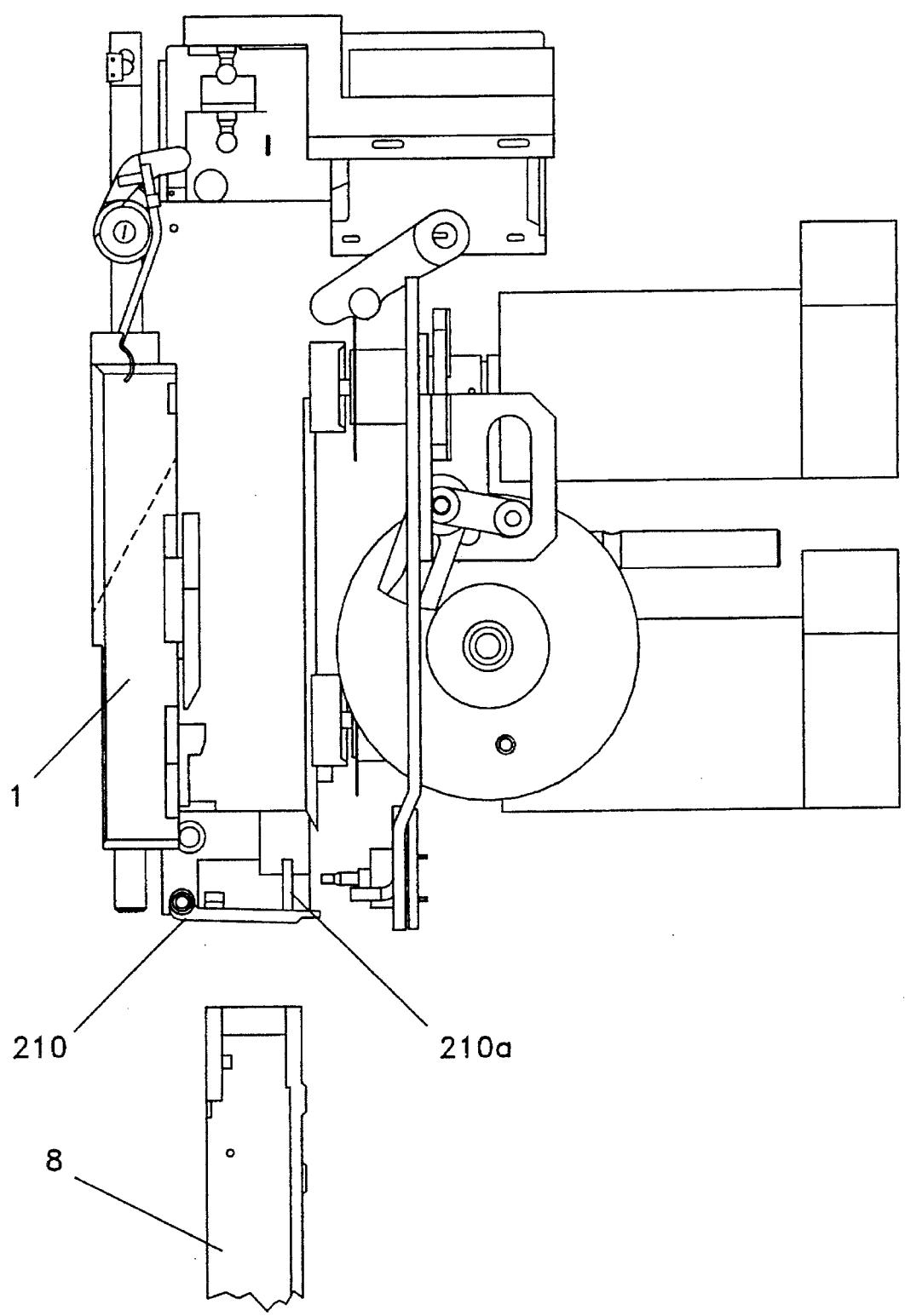
FIG. 13–16 are a series of top plan view of the loader mechanism of FIG. 1 with portions cut away to better illustrate the cartridge loading sequence.
Figure 14:
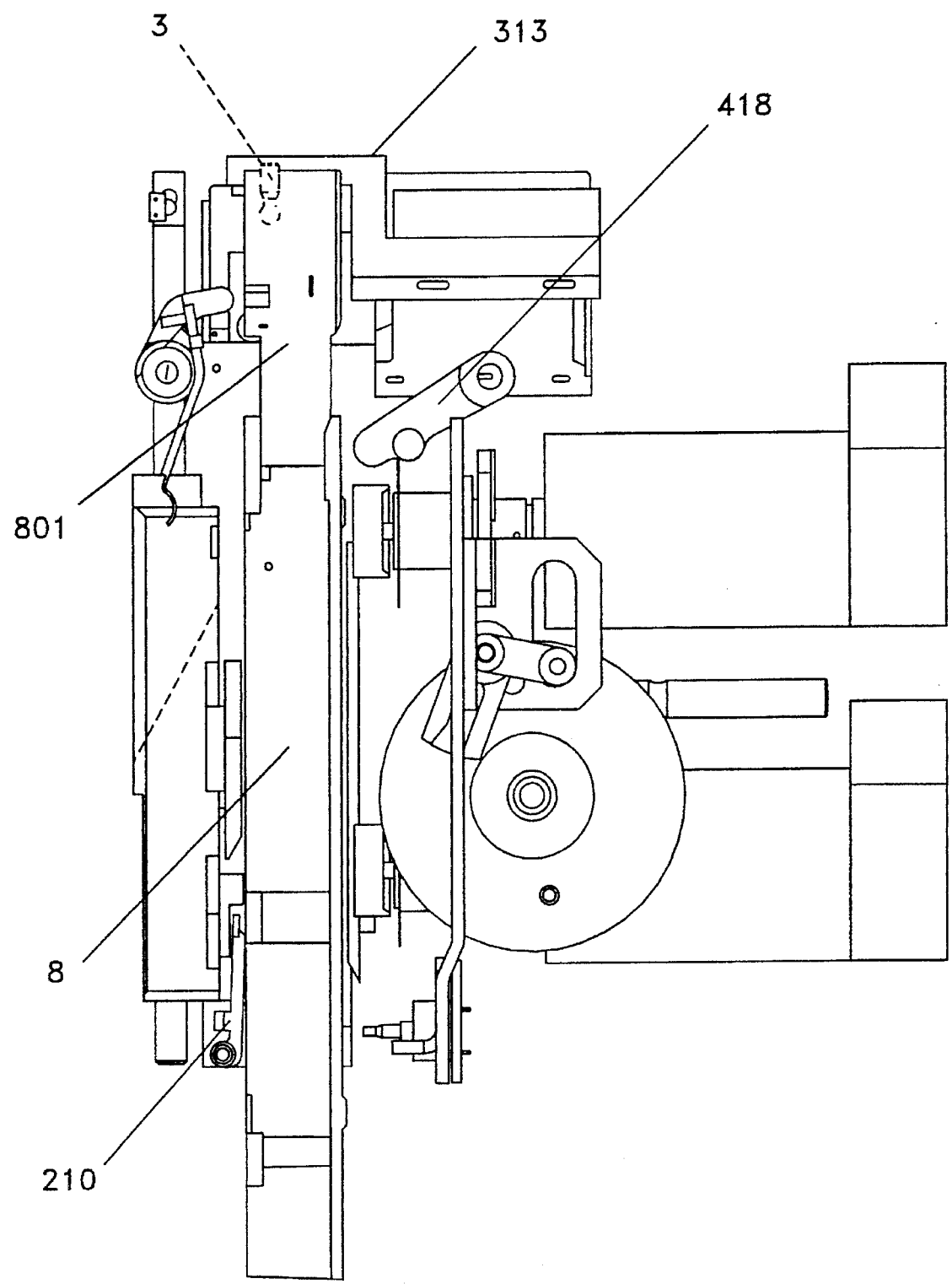

Further details of the structure of the preferred embodiment of our loader mechanism, and in particular, the cartridge registration mechanisms thereof, will now be described in conjunction with a description of its operation. FIG. 9 and 13 illustrate the configuration of the loader mechanism 1 before the tape cartridge 8 has been inserted therein. As the user (or picker) pushes the forward end of the tape cartridge 8 into the loader mechanism 1, the forward end or leading edge of the cartridge 8 pushes the door 210 open. The spring biased door 210 which normally covers the cartridge insertion slot as shown in FIG. 13, pivots inwardly to its opened position illustrated in FIG. 14. As the user (or picker) continues to push the tape cartridge 8 into the loader mechanism 1, the leading or forward bottom corner of the tape cartridge 8 depresses the lock tooth 724 (FIG. 7) on the lock bracket 717. The lock bracket 717 engages and moves the lock bearing 719 downwardly so that its remote end engages the base plate 301. This prevents the carriage assembly 204 from moving along the cartridge insertion axis. The locking of the carriage assembly 204 at this time facilitates the sliding insertion of the tape cartridge 8 into the carriage assembly 204 while eliminating the risk that the tape access door 801 will be opened into the head H. The head H is a very expensive, delicate transducer whose face can be damaged if struck by a foreign object. As the user (or picker) continues to push the tape cartridge 8 into the loader mechanism 1, the pin 733 (FIG. 7) on the door opener frame 711 slides into the slot 801a (FIG. 8) in the tape access door 801 of the tape cartridge 8.

Continued pushing on the tape cartridge 8 by the user (or picker) causes the door opener frame 711 to pivot the tape access door 801 open. This opening of the tape access door 801 is facilitated by engagement of the spring biased plastic opener bearing 712. The opener bearing 712 rubs against the front upper corner of the rigid Aluminum mount plate 806 of the tape cartridge 8 to provide a fulcrum. The spring loading of the opener bearing 712 accommodates tolerance variations between the tape access door opener mechanism and the tape cartridge 8. Preferably the opener bearing 712 is lubricated so it will not damage the tape cartridge 8.

As the user (or picker) continues to push the tape cartridge 8 forwardly into the loader mechanism 1, the tape access door 801 reaches its fully opened position best seen in FIG. 11. In this position, the tape access door 801 blocks a cartridge-present sensor 2. This sensor may be a conventional optical emitter/detector pair, whose beam is interrupted by the presence of the tape access door 801.

Eventually the pushing on the tape cartridge 8 by the user (or picker) results in the middle retention notch in the bottom side edge of the tape cartridge 8 arriving at a position in the carriage assembly 204 that permits the carriage lock tooth 724 to rise and engage the notch under the force of torsion spring 718 (FIG. 7). This disengages the outer end of the lock bearing 719 from the metal cast base plate 301. The carriage assembly 204 is now free to slide along the cartridge insertion axis which is parallel to the axis of the carriage shaft 207 (FIG. 2).

As the user (or picker) continues to push the tape cartridge 8 into the loader mechanism 1, the carriage assembly 204 begins to move forwardly along the cartridge insertion axis initially carrying the tape cartridge 8 therewith. Continued forward manual pushing on the tape cartridge 8 by the user (or picker) results in the outer end of the lock bearing 719 (FIG. 7) moving over a higher surface elevation of the cast metal base plate 301 (FIG. 3), thereby preventing the disengagement of the lock tooth 724. This prevents the user from removing the tape cartridge 8 after the automatic (motor driven) loading operation commences.

Further pushing on the tape cartridge 8 causes a flag in the form of the flange 728 (FIG. 2) on the carriage assembly 204 to unblock the home position sensor 606 (FIG. 1). This is controlled by the position and shape of the flange 728 which is a cut and bent extension of the horizontal portion of the L-shaped carriage frame 701 (FIG. 7). The plastic follower lever 721 and the spring 720 bias the carriage assembly 204 towards its rearward most or home position.

The cartridge present sensor 2 (FIG. 11) and the home position sensor 606 (FIG. 1) now signal to a control circuit 1000 (FIG. 17) of the loader mechanism 1 that the required states for automatic cartridge loading have been met. The control circuit 1000 energizes the loader motor 608 (FIG. 6) which rotates the cam assembly 412 (FIG. 4) through the gear train 610, 602, 603 and 604. The follower bearing 421 (FIG. 4) on the cam assembly 412 moves in the transverse slot 729 (FIG. 7) in the carriage frame 701. This moves the carriage assembly 204, and the tape cartridge 8, now mated therewith, in a forward direction along the cartridge insertion axis.

Shortly after the carriage assembly 204 begins to be driven forwardly by the cam assembly 412, a brake pad 737 (FIG. 7) on an inwardly directed portion of the clamp arm 704 engages the middle retention notch 803 (FIG. 8) on the upper side edge of the tape cartridge 8. The retention middle notch 803 has the same shape and location as the middle retention notch on the lower side edge of the tape cartridge 8 which was earlier engaged by the lock tooth 724. The engagement of the brake pad 737 with the top edge of the tape cartridge 8 provides additional gripping of the tape cartridge.

Figure 15:
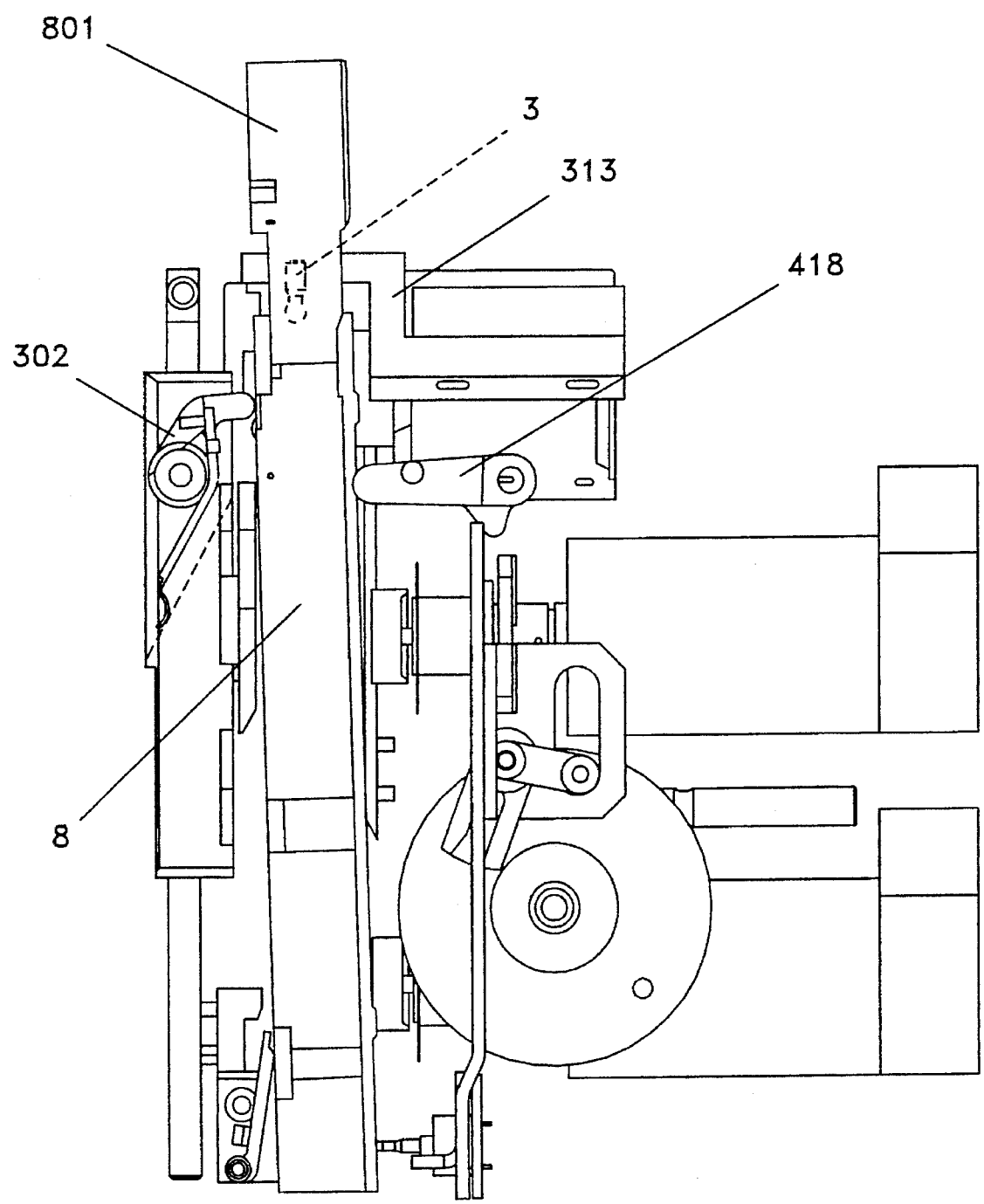
Figure 16:
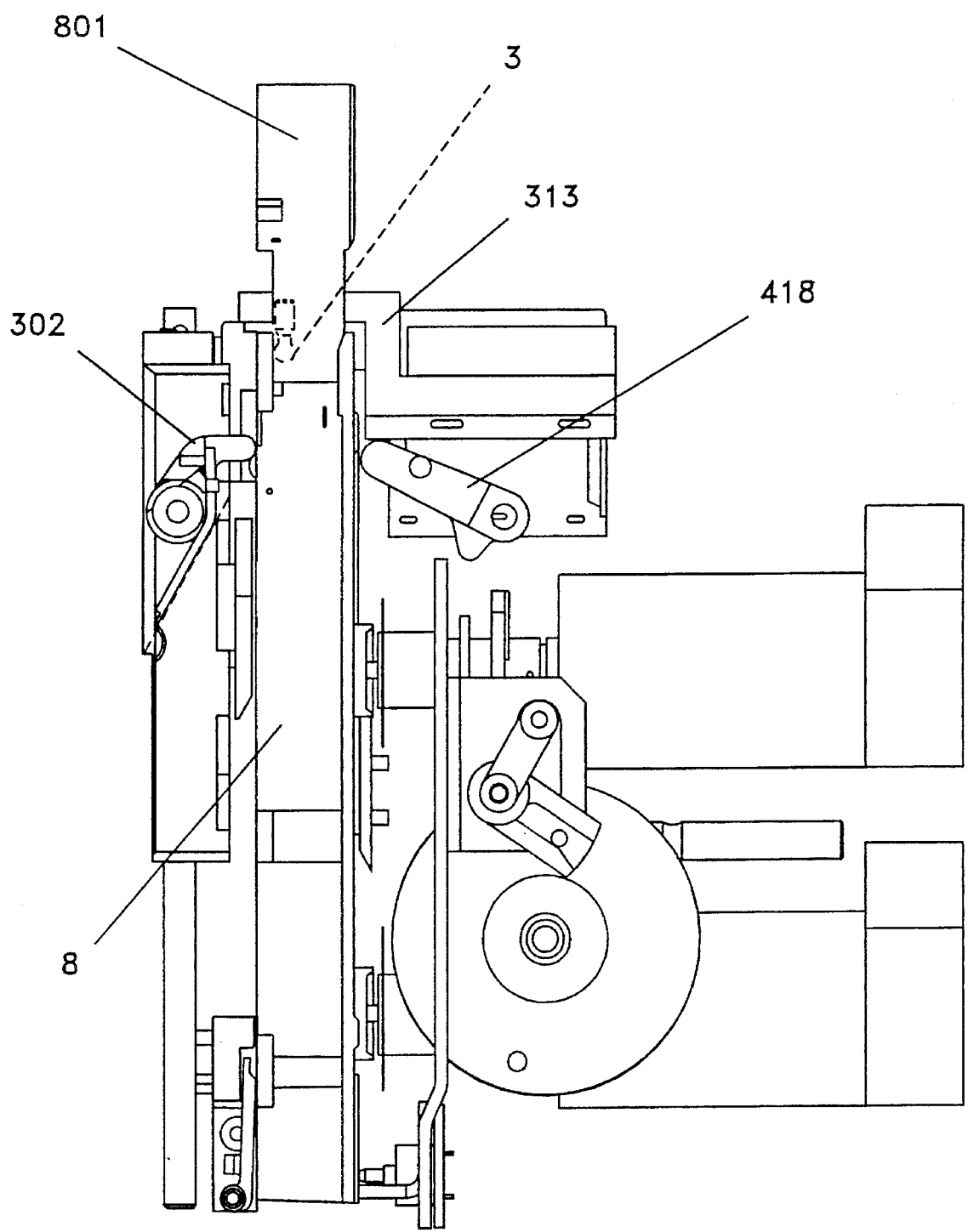

As the carriage assembly 204 continues to be driven forward by the motor 608, a vertical post 418a on a generally planar flipper 418 (FIG. 4) is engaged by a forward edge of the carriage frame 701. A pair of trunions 418b of the flipper 418 are journaled about a vertical shaft 422 whose lower end is secured in the motor mount 401. The flipper 418 is thus capable of rotating or pivoting about the vertical axis of the shaft 422. This rotation occurs when the leading edge of the carriage frame 701 pushes forwardly against the post 418a of the flipper 418. The rotation of the flipper 418 causes it to engage the plastic cover 807 of the tape cartridge as best seen in FIG. 15. This pushes the forward end of the tape cartridge 8 in a transverse direction resulting in its slanted or skewed orientation illustrated in FIG. 15. The rotation of the flipper 418 and its engagement with the tape cartridge 8 are timed so that the inside surface 806a of the forward end of the Aluminum mount plate 806 is maneuvered around a pair of vertically spaced skew datums 3. Continued forward movement of the mated carriage assembly 204 and the tape cartridge 8 causes further clockwise rotation of the flipper 418 as best seen in FIG. 16. The remote end of the flipper 418 eventually disengages the cover 807 of the tape cartridge 8 permitting subsequent clamping of the cartridge by other mechanisms hereinafter described to push the forward end of the cartridge back into parallel alignment with the cartridge insertion axis as shown in FIG. 16. The inside registration surface 806a of the Aluminum mount plate 806 is pushed against the skew datums 3. The active flipper 418 thus serves to prevent undo wear on the skew datums 3 which would otherwise result from the sharp edge of the Aluminum mount plate 806 engaging the datums 3 on direct insertion of the tape cartridge 8.

Each of the skew datums 3 has a generally cylindrical configuration with a rounded outer end that contacts the inner surface 806a at the forward end of the tape cartridge 8. The tape cartridge 8 will be manufactured with very close tolerances with regard to the inner surface 806a. The upper skew datum 3 engages the inner surface 806a adjacent the rearward end of the tape access door 801. The lower skew datum 3 engages the inner surface 806a in the registration opening 802 (FIG. 8) of the tape cartridge 8. The skew datums 3 are rigidly connected to and extend from a frame member 313 (FIG. 16).

Figure 12:
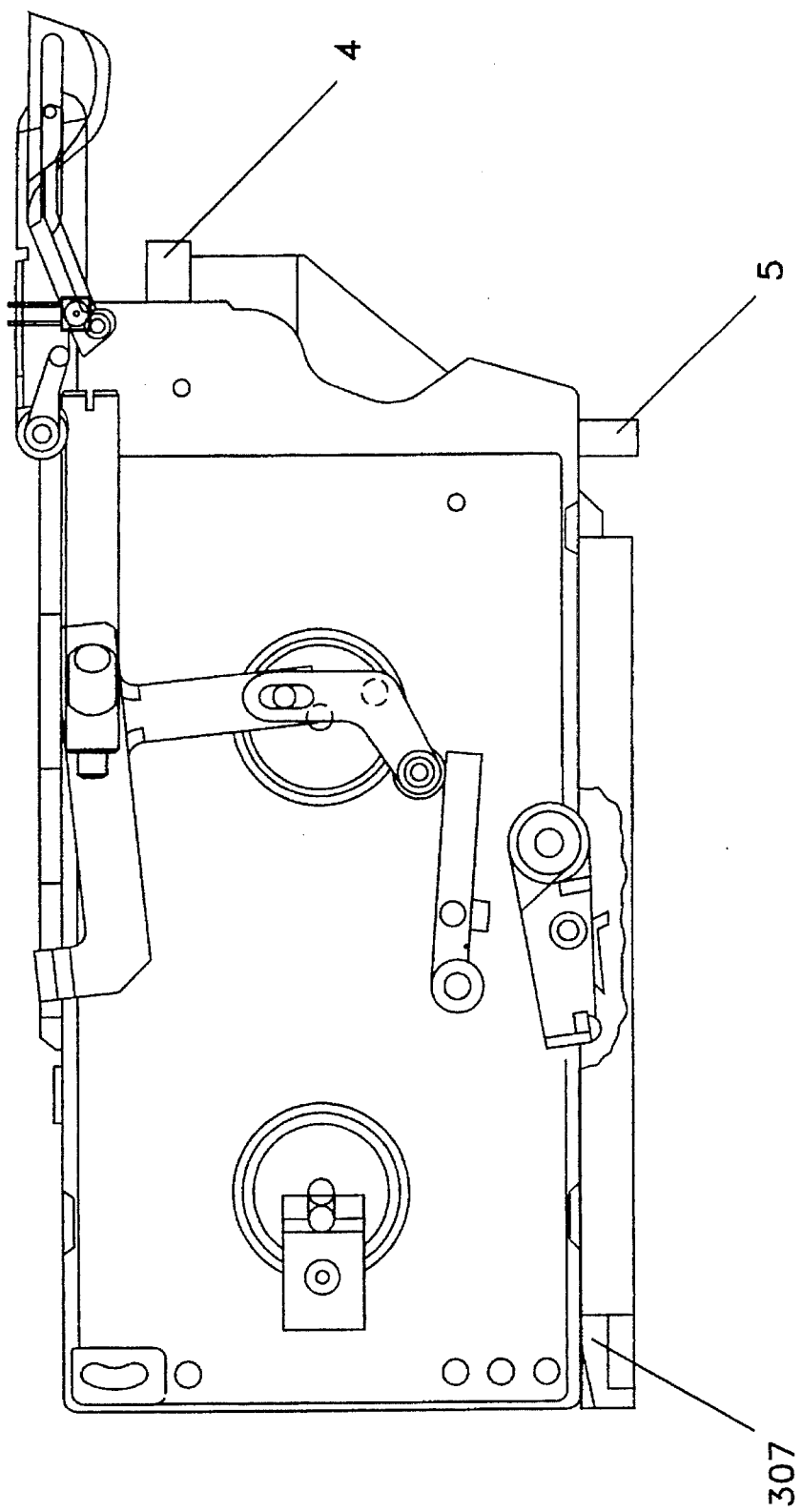

Continued forward driven motion of the carriage assembly 204 causes the forward end of the mount plate 806 of the tape cartridge 8 to engage and register against a tertiary datum 4 (FIG. 12). This stops the forward movement of the tape cartridge 8. However, the carriage assembly 204 continues to be driven forward causing the primary clamp 302 to press the inside surfaces 806a of the cartridge mount plate 806 against the two skew datums 3. At the same time, the linkage arm 705 (FIG. 7) engages the spring loaded ramp 308 (FIG. 3) causing the clamp arm 704 to pivot and press the tape cartridge 8 forward and down against datums 4 and 5 (FIG. 12) and 307 (FIG. 3). The pivot of the clamp arm 704 is loaded by spring 709 along the axis of the slider shaft 708 which it engages. This prevents overloading against the tertiary datum 4.

The outer post 719a (FIG. 7) of the carriage lock 719 follows a shoulder 301c (FIG. 3) of the base plate. This insures that the lock tooth 724 initially locks the tape cartridge to the carriage assembly 204 and then unlocks it to allow the carriage assembly to travel on forward. Lock bracket 717 swings into and out of recesses 301a and 301b (FIG. 3) in the base plate 301.

At the same time that the tape cartridge 8 is registered against the datums and clamped into position, further rotation of the cam assembly 412 moves the retractor plate 408 through the retraction linkage 405. This is done through the downwardly extending post 213 (FIG. 2) on the underside of the cam assembly 412. The post 213 rides in the receiver 505 of the retraction link assembly 405. Rotation of this retraction link assembly 405 causes the arm 506 (FIG. 5) thereof and its roller 501 to travel over center and release the retractor plate 408 toward the tape cartridge 8. The retractor plate 408 is biased toward the tape cartridge 8 by the shaft compression spring 404 (FIG. 4) and by the compression of the clutch assemblies 409.

As the retractor plate 408 (FIG. 4) approaches the plastic cover 807 of the tape cartridge 8, several events occur. A pressure-type mechanical file protect sensor 423 (FIG. 4) and four pressure-type mechanical cartridge identification sensors 424 sense the status of the write enable switch 817 (FIG. 8) and the number of the cartridge identification holes 805, respectively, on the rear end of the cartridge cover 807. The clutch assemblies 409 engage the toothed reel hubs 804 and 808. A tab 408a (FIG. 4) which extends perpendicularly from the retractor plate 408 presses against the plastic cover 807 of the tape cartridge 8 so that its Aluminum mount plate 806 is pressed against the primary datum 305 (FIG. 3) mounted on the vertical clamping plate 311. At least one of the five sensors 423 and 424 (FIG. 4) will change state to indicate to the control circuit 1000 that the automatic loading operation has been completed. The fact that not all of the five sensors are allowed to be depressed ensures that at least one of them has aligned correctly with one of the identification holes 805 (FIG. 8) in the tape cartridge 8 and that the tape cartridge has therefore been correctly loaded into the loader mechanism. On completion of the automatic cartridge loading sequence, the follower bearing 421 on the cam assembly 412 has been driven over center in the transverse slot 729 (FIG. 7) in the carriage frame 701. This also helps to lock the cartridge 8 against the datums heretofore described.

As long as the cartridge present sensor 2 has not been unlocked, the control circuit 1000 of the loader mechanism can detect that the tape cartridge 8 has not been removed. A tape cartridge can be automatically reloaded remotely without any user intervention. A user (or picker) may also reload the tape cartridge 8 without removing it by simply pushing the cartridge into the loader mechanism a second time. This action causes the follower bearing 421 on top of the cam assembly 412 to deflect the carriage follower lever 721.

Figure 17:
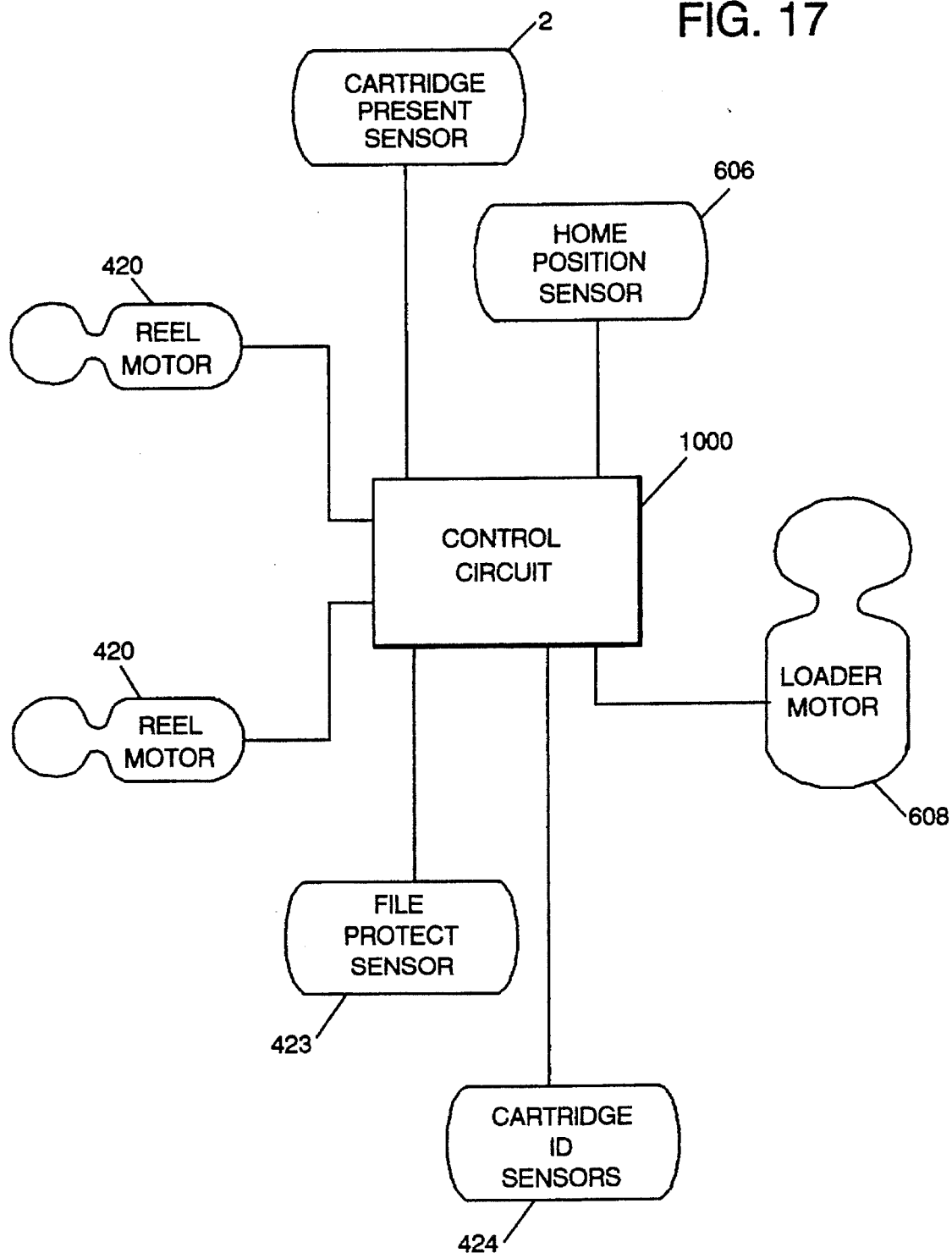
FIG. 17 is a block diagram showing a control circuit for the loader mechanism of FIG. 1 connected to its motors and sensors.

The connection of the control circuit of the preferred embodiment of our automatic loader mechanism to its motors and sensors is illustrated in block diagram form in FIG. 17. The control circuit 1000 can exercise and thereby test the automatic loader mechanism 1 without a tape cartridge inserted therein. There are no mechanical interlocks in the loader mechanism 1 that require a tape cartridge to be inserted before it can operate. A preferred opportunity to diagnose the loader mechanism 1 is when the tape drive incorporating the same is first powered up. The programming of the tape drive can initiate the test without the normally required states of the cartridge present sensor 2 and the home positioner sensor 606. The control circuit 1000 detects the load complete position when one of the cartridge identification sensors 424 depresses against a tab 210a (FIG. 13) molded into the back side of the cartridge insertion slot door 210. A tab 408a (FIG. 4) on the side of the retractor 408 moves behind the door 210 in the loaded state to thereby prevent a user (or picker) from inadvertently inserting a tape cartridge at this time. The insertion of a cartridge when the loader mechanism 1 is in this state could otherwise damage the sensors 423 and 424 and the clutch assemblies 409. When the carriage assembly 204 returns and blocks the home position sensor 606, the control circuit 1000 will have completed the loader mechanism self-diagnosis.

While we have described a preferred embodiment of our automatic loader mechanism which has been specifically designed to operate with the improved tape cartridge of the aforementioned U.S. Pat. No. 5,294,072 of John G. East, et al., it will be understood that variations and modifications of our invention will occur to those skilled in the art. For example, our invention could be utilized with other tape cartridges. Accordingly, the protection afforded our invention should only be limited in accordance with the scope of the following claims.

We claim:

1. A loader mechanism for a generally rectangular tape cartridge having a rigid mount plate for precision registration, a box-like cover secured to the mount plate, a pair of reels mounted between the mount plate and the cover with hubs accessible through openings in the cover adapted to be engaged by clutch assemblies for unlocking and rotating the reels, a length of magnetic tape wound about the reels and extending along a tape path adjacent a forward end of the cartridge, and a tape access door pivotable about an axis perpendicular to the mount plate to open a tape access opening in the forward end of the cartridge to permit a head to engage an exposed segment of the tape, the loader mechanism comprising:

a base assembly;

a carriage assembly for slidingly receiving the tape cartridge;

means for supporting the carriage assembly on the base assembly for forward and rearward movement along a cartridge insertion axis;

means connected to the carriage assembly for opening the tape access door of the tape cartridge as the cartridge is slid forwardly into the carriage assembly;

means mounted to the base assembly for automatically moving the carriage assembly forward for engaging the exposed segment of tape in the tape cartridge with a head after the tape access door has been opened; and a clutch retraction assembly mounted to the base assembly including a pair of clutch assemblies, means for rotatably supporting the clutch assemblies, a pair of reel motors each drivingly connected to a corresponding one of the clutch assemblies, and means for automatically moving the clutch assemblies transverse to the cartridge insertion axis to engage the clutch assemblies with the reel hubs of the tape cartridge.

2. A loader mechanism according to claim 1 and further comprising cartridge registration means mounted to the base assembly for automatically clamping the mount plate of the tape cartridge against a plurality of datum locations when the head is engaged with the exposed segment of the tape.

3. A loader mechanism according to claim 1 wherein the door opening means includes a pivotable arm with a pin that engages a slot in the tape access door.

4. A loader mechanism according to claim 2 wherein the cartridge registration means includes a primary clamp mounted on a clamping plate portion of the base assembly for pressing the mount plate of the cartridge against the plurality of datum locations.

5. A loader mechanism according to claim 1 wherein the means for automatically moving the carriage assembly and the means for automatically moving the clutch assemblies includes a cam, means for rotatably supporting the cam, and cam motor means for driving the cam, the cam having a first bearing surface that moves the carriage assembly forwardly and rearwardly along the cartridge insertion axis and a second bearing surface that moves the clutch supporting means transverse to the cartridge insertion axis.

6. A loader mechanism according to claim 2 wherein the plurality of datum locations includes a pair of skew datums positioned for engaging an inner surface of a forward end of the mount plate at a pair of vertically spaced locations.

7. A loader mechanism according to claim 6 wherein the cartridge registration means further includes a flipper, and means for pivotally mounting the flipper to the base assembly so that it will engage a forward portion of the tape cartridge and temporarily move it transversely out of alignment with the cartridge insertion axis.

8. A loader mechanism according to claim 1 and further comprising a door and means for hingedly mounting the door to the base assembly for opening and closing a cartridge insertion slot in the carriage assembly, the door having a tab formed thereon for engagement by a sensor during a self-diagnosis operation of the loader mechanism.

9. A loader mechanism according to claim 1 and further comprising a clamp arm having a remote end for engaging a retention notch in an upper side edge of the tape cartridge, means for mounting an inner end of the clamp arm to the carriage assembly for pivotal motion with respect thereto and for sliding motion with respect thereto along the cartridge insertion axis, and linkage arm means pivotally connected to the carriage assembly for engaging the base assembly and the clamp arm to move the remote end of the clamp arm into and out of engagement with the retention notch in the upper side edge of the tape cartridge during movement of the carriage assembly.

10. A loader mechanism according to claim 1 and further comprising a lock bracket pivotally connect to the carriage assembly and having a tooth on a remote end thereof, and a lock bearing pivotally mounted to the carriage assembly for slidingly engaging a portion of the base assembly to temporarily lock the position of the carriage assembly relative to the base assembly and for thereafter moving the lock bracket to temporarily move the tooth on the lock bracket into engagement with a notch in the lower side edge of the tape cartridge.

11. A loader mechanism for a generally rectangular tape cartridge with a pair of hubs accessible through openings in a cover and a tape access door at a forward end of the cartridge pivotable about an axis perpendicular to a rigid mount plate to expose a segment of the tape, the loader mechanism comprising:

a base assembly;

a carriage assembly for slidingly receiving the tape cartridge;

means for supporting the carriage assembly on the base assembly for forward and rearward movement along a cartridge insertion axis;

means connected to the carriage assembly for opening the tape access door of the tape cartridge as the cartridge is slid forwardly into the carriage assembly;

means mounted to the base assembly for automatically moving the carriage assembly forward for engaging the exposed segment of tape in the tape cartridge with a head after the tape access door has been opened; and cartridge registration means mounted to the base assembly for automatically clamping the mount plate of the tape cartridge against a plurality of datum locations when the head is engaged with the exposed segment of the tape.

12. A loader mechanism according to claim 11 and further comprising a clutch retraction assembly mounted to the base assembly including a pair of clutch assemblies, means for rotatably supporting the clutch assemblies, a pair of reel motors each drivingly connected to a corresponding one of the clutch assemblies, and means for automatically moving the clutch assemblies transverse to the cartridge insertion axis to engage the clutch assemblies with the reel hubs of the tape cartridge.

13. A loader mechanism according to claim 11 wherein the cartridge registration means includes a primary clamp mounted on a clamping plate portion of the base assembly for pressing the mount plate of the cartridge against the plurality of datum locations.

14. A loader mechanism according to claim 12 wherein the means for automatically moving the carriage assembly and the means for automatically moving the clutch assemblies includes a cam, means for rotatably supporting the cam, and cam motor means for driving the cam, the cam having a first bearing surface that moves the carriage assembly forwardly and rearwardly along the cartridge insertion axis and a second bearing surface that moves the clutch supporting means transverse to the cartridge insertion axis.

15. A loader mechanism according to claim 11 wherein the door opening means includes a pivotable arm with a pin that engages a slot in the tape access door.

16. A loader mechanism according to claim 11 and further comprising means for biasing the carriage assembly to a home position.

17. A loader mechanism according to claim 16 and further comprising sensor means for detecting when the carriage assembly has moved to the home position and for generating a signal representative of a home position state.

18. A loader mechanism according to claim 11 wherein the carriage assembly includes a generally L-shaped carriage frame, bearing block means mounted to the base assembly for slidingly supporting a first side of the carriage frame and a reel motor retraction assembly mounted to the base assembly for slidingly supporting a second side of the carriage frame.

19. A loader mechanism according to claim 11 and further comprising a carriage guide mounted to the reel motor retraction assembly and having a post portion located in a slot formed in the carriage frame which extends parallel to the cartridge insertion axis.

20. A loader mechanism for a generally rectangular tape cartridge having a rigid mount plate for precision registration, a box-like cover secured to the mount plate, a pair of reels mounted between the mount plate and the cover with hubs accessible through openings in the cover adapted to be engaged by clutch assemblies for unlocking and rotating the reels, a length of magnetic tape wound about the reels and extending along a tape path adjacent a forward end of the cartridge, and a tape access door pivotable about an axis perpendicular to the mount plate to open a tape access opening in the forward end of the cartridge to permit a head to engage an exposed segment of the tape, the loader mechanism comprising:

a base assembly;

a carriage assembly for slidingly receiving the tape cartridge;

means for supporting the carriage assembly on the base assembly for forward and rearward movement along a cartridge insertion axis;

means connected to the carriage assembly for opening the tape access door of the tape cartridge as the cartridge is slid forwardly into the carriage assembly by a user or a picker, the tape access door opening means including a pivotable arm with a pin that engages a slot in the tape access door;

a clutch retraction assembly mounted to the base assembly including a pair of clutch assemblies, means for rotatably supporting the clutch assemblies and a pair of reel motors each drivingly connected to a corresponding one of the clutch assemblies;

cartridge registration means mounted to the base assembly for automatically clamping the mount plate of the tape cartridge against a plurality of datum locations when the head is engaged with the exposed segment of the tape including a primary clamp mounted on a clamping plate portion of the base assembly for pressing the mount plate of the cartridge against the plurality of datum locations, the datum locations includes a pair of skew datums positioned for engaging an inner surface of a forward end of the mount plate at a pair of vertically spaced locations;

means mounted to the base assembly for automatically moving the carriage assembly to engage the exposed segment of tape with a head and for automatically moving the clutch assemblies to engage the hubs including a cam, means for rotatably supporting the cam, and cam motor means for driving the cam, the cam having a first bearing surface that moves the carriage assembly forwardly and rearwardly along the cartridge insertion axis and a second bearing surface that moves the clutch supporting means transverse to the cartridge insertion axis;

a clamp arm having a remote end for engaging a notch in an upper side edge of the tape cartridge, means for mounting an inner end of the clamp arm to the carriage assembly for pivotal motion with respect thereto and for sliding motion with respect thereto along the cartridge insertion axis, and linkage arm means pivotally connected to the carriage assembly for engaging the base assembly and the clamp arm to move the remote end of the clamp arm into and out of engagement with the notch in the upper side edge of the tape cartridge during movement of the carriage assembly; and a lock bracket pivotally connected to the carriage assembly and having a tooth on a remote end thereof, and a lock bearing pivotally mounted to the carriage assembly for slidingly engaging a portion of the base assembly to temporarily lock the position of the carriage assembly relative to the base assembly and for thereafter moving the lock bracket to temporarily move the tooth on the lock bracket into engagement with a notch in the lower side edge of the tape cartridge.

21. A loader mechanism for a generally rectangular tape cartridge having a rigid mount plate for precision registration, a box-like cover secured to the mount plate, at least one reel mounted between the mount plate and the cover with a hub accessible through an opening in the cover adapted to be engaged by a clutch assembly for unlocking and rotating the reel, a length of magnetic tape wound about the reel and extending along a tape path adjacent a forward end of the cartridge, and a tape access door pivotable about an axis perpendicular to the mount plate to open a tape access opening in the forward end of the cartridge to permit a head to engage an exposed segment of the tape, the loader mechanism comprising:

a base assembly;

a carriage assembly for slidingly receiving the tape cartridge;

means for supporting the carriage assembly on the base assembly for forward and rearward movement along a cartridge insertion axis;

means connected to the carriage assembly for opening the tape access door of the tape cartridge as the cartridge is slid forwardly into the carriage assembly;

means mounted to the base assembly for automatically moving the carriage assembly forward for engaging the exposed segment of tape in the tape cartridge with a head after the tape access door has been opened; and a reel motor retraction assembly mounted to the base assembly including a clutch assembly, means for rotatably supporting the clutch assembly, a reel motor drivingly connected to the clutch assembly, and means for automatically moving the clutch assembly transverse to the cartridge insertion axis to engage the clutch assembly with the reel hub of the tape cartridge.

22. A loader mechanism according to claim 21 and further comprising cartridge registration means mounted to the base assembly for automatically clamping the mount plate of the tape cartridge against a plurality of datum locations when the head is engaged with the exposed segment of the tape.

23. A loader mechanism according to claim 21 wherein the door opening means includes a pivotable arm with a pin that engages a slot in the tape access door.

24. A loader mechanism according to claim 22 wherein the cartridge registration means includes a primary clamp mounted on a clamping plate portion of the base assembly for pressing the mount plate of the cartridge against the plurality of datum locations.

25. A loader mechanism according to claim 21 wherein the means for automatically moving the carriage assembly and the means for automatically moving the clutch assembly includes a cam, means for rotatably supporting the cam, and cam motor means for driving the cam, the cam having a first bearing surface that moves the carriage assembly forwardly and rearwardly along the cartridge insertion axis and a second bearing surface that moves the clutch supporting means transverse to the cartridge insertion axis.

26. A loader mechanism according to claim 22 wherein the plurality of datum locations includes a pair of skew datums positioned for engaging an inner surface of a forward end of the mount plate at a pair of vertically spaced locations.

27. A loader mechanism according to claim 26 wherein the cartridge registration means further includes a flipper, and means for pivotally mounting the flipper to the base assembly so that it will engage a forward portion of the tape cartridge and temporarily move it transversely out of alignment with the cartridge insertion axis.

28. A loader mechanism according to claim 21 and further comprising a door and means for hingedly mounting the door to the base assembly for opening and closing a cartridge insertion slot in the carriage assembly, the door having a tab formed thereon for engagement by a sensor during a self-diagnosis operation of the loader mechanism.

29. A loader mechanism according to claim 21 and further comprising a clamp arm having a remote end for engaging a retention notch in an upper side edge of the tape cartridge, means for mounting an inner end of the clamp arm to the carriage assembly for pivotal motion with respect thereto and for sliding motion with respect thereto along the cartridge insertion axis, and linkage arm means pivotally connected to the carriage assembly for engaging the base assembly and the clamp arm to move the remote end of the clamp arm into and out of engagement with the retention notch in the upper side edge of the tape cartridge during movement of the carriage assembly.

30. A loader mechanism according to claim 21 and further comprising a lock bracket pivotally connect to the carriage assembly and having a tooth on a remote end thereof, and a lock bearing pivotally mounted to the carriage assembly for slidingly engaging a portion of the base assembly to temporarily lock the position of the carriage assembly relative to the base assembly and for thereafter moving the lock bracket to temporarily move the tooth on the lock bracket into engagement with a notch in the lower side edge of the tape cartridge.

31. A tape drive including a loader mechanism for a generally rectangular tape cartridge with a pair of hubs accessible through openings in a cover and a tape access door at a forward end of the cartridge pivotable about an axis perpendicular to a rigid mount plate to expose a segment of the tape, the loader mechanism comprising:

a base assembly;

a carriage assembly for slidingly receiving the tape cartridge;

means for supporting the carriage assembly on the base assembly for forward and rearward movement along a cartridge insertion axis;

means connected to the carriage assembly for opening the tape access door of the tape cartridge as the cartridge is slid forwardly into the carriage assembly;

means mounted to the base assembly for automatically moving the carriage assembly forward for engaging the exposed segment of tape in the tape cartridge with a head after the tape access door has been opened; and cartridge registration means mounted to the base assembly for automatically clamping the mount plate of the tape cartridge against a plurality of datum locations when the head is engaged with the exposed segment of the tape.

* * * * *

UNITED STATES PATENT AND TRADEMARK OFFICE
CERTIFICATE OF CORRECTION

PATENT NO. : 5,495,374
DATED : February 27, 1996
INVENTOR(S) : Hiscox et al.

It is certified that error appears in the above-indentified patent and that said Letters Patent is hereby corrected as shown below:

Column 14, line 2, change "connect to" --connected to--;

Column 18, line 2, change "connect to" to --connected to--.

Signed and Sealed this

Eleventh Day of March, 1997

Attest:

BRUCE LEHMAN

Attesting Officer

Commissioner of Patents and Trademarks